US009094512B2

(12) United States Patent
Sheldon et al.

(10) Patent No.: US 9,094,512 B2
(45) Date of Patent: Jul. 28, 2015

(54) DETERMINING APPROPRIATE COURSE FOR REPRESENTATIVE WORKING TO RECOVER PAYMENT IN ARREARS

(71) Applicant: BANK OF AMERICA CORPORATION, Charlotte, NC (US)

(72) Inventors: Andrew Sheldon, Mountain Top, PA (US); Brian J. Dunne, Medford, NJ (US); Hudson Philip Hoen, IV, Wilmington, DE (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/072,616

(22) Filed: Nov. 5, 2013

(65) Prior Publication Data

US 2015/0124958 A1    May 7, 2015

(51) Int. Cl.
  *H04M 3/00* (2006.01)
  *H04M 3/51* (2006.01)
(52) U.S. Cl.
  CPC .............. *H04M 3/51* (2013.01); *H04M 3/5175* (2013.01)
(58) Field of Classification Search
  CPC ............ H04M 3/5175; H04M 3/5183; H04M 3/5191; H04M 3/5166; H04M 3/51; H04M 3/523

USPC ........................... 379/266.07, 265.01–265.02
See application file for complete search history.

(56) References Cited

U.S. PATENT DOCUMENTS

| 2002/0026459 A1* | 2/2002 | Fernandez .................... 707/506 |
| 2002/0173971 A1* | 11/2002 | Stirpe et al. ....................... 705/1 |
| 2008/0201199 A1* | 8/2008 | Armstrong et al. ............. 705/10 |

* cited by examiner

*Primary Examiner* — Rasha Al Aubaidi
(74) *Attorney, Agent, or Firm* — Michael A. Springs; Moore & Van Allen PLLC; Patrick B. Horne

(57) ABSTRACT

Embodiments of the invention are directed to a system, method, or computer program product for determining an appropriate course of action for a representative working to recover payment in arrears. Embodiments may determine at least one customer preference regarding limitation of representative-customer interactions; and, based on the at least one customer preference, present assistance information to the representative before or during the representative-customer interaction, the assistance information configured to at least one of inform the representative of the at least one customer preference, present the representative with at least one proposed question for presentation to the customer, or present the representative with at least one proposed method for representative-customer interaction.

21 Claims, 18 Drawing Sheets

MANAGEMENT GROUP [ ]

CUSTOMERS — 602

| CUSTOMER NAME | TYPE |
|---|---|
| NAME 1 | PRIMARY |
| NAME 2 | PRIMARY |
| NAME 3 | PRIMARY |
| NAME 4 | SECONDARY |
| NAME 5 | GUARANTOR — 606 |

PRIMARY CONTACT PHONE NUMBERS — 604

| TYPE | PHONE NUMBER | SOURCE | Acct# |
|---|---|---|---|
| HOME | | CREDIT CARD | ACCT |
| VACATION | | | |
| CELL | | | |
| HOME | | | |
| VACATION | | | |
| CELL | | | |
| HOME | PHONE NUMBER # | COMMERCIAL | ACCT |
| WORK | | | |
| VACATION | | | |
| CELL | | | |

CUSTOMER UNDERLYING CIRCUMSTANCE — 610

DATE; TIME; COMMENTS

[ OK ] [ CANCEL ]

RELATIONSHIP ACCOUNTS — 608

| CUSTOMER 1 | RELATIONSHIP<br>LEAD ACCOUNT | BALANCE<br>PAST DUE | LAST PAY<br>DATE<br>AMOUNT: _____ | DOP<br>Gov't Id:<br>STATUS: |
|---|---|---|---|---|
| CUSTOMER 2 | RELATIONSHIP<br>LEAD ACCOUNT | BALANCE<br>PAST DUE | LAST PAY<br>DATE<br>AMOUNT: _____ | DOP<br>Gov't Id:<br>STATUS: |
| CUSTOMER 3 | RELATIONSHIP<br>LEAD ACCOUNT | BALANCE<br>PAST DUE | LAST PAY<br>DATE<br>AMOUNT: _____ | DOP<br>Gov't Id:<br>STATUS: |
| CUSTOMER 4 | RELATIONSHIP | BALANCE<br>PAST DUE | LAST PAY<br>DATE<br>AMOUNT: _____ | DOP<br>Gov't Id:<br>STATUS: |
| CUSTOMER 5 | RELATIONSHIP | BALANCE<br>PAST DUE | LAST PAY<br>DATE<br>AMOUNT: _____ | DOP<br>Gov't Id:<br>STATUS: |

DETERMINING APPROPRIATE COURSE FOR REPRESENTATIVE WORKING TO RECOVER PAYMENT IN ARREARS

BACKGROUND

Customer service is a priority for merchants and other entities. When customers contact a customer service representative, the customer service representative should be able to answer the customer's questions or concerns.

For most entities with multiple products, the customer service representative may not know exactly why the customer is contacting him/her. As such, the representative may have to ask the customer several introductory questions, in order to properly answer the customer's questions or concerns. This introductory period may be time consuming. Furthermore, if the customer has follow up communications with a customer service department of an entity, the customer may have to again have to answer introductory questions on his/her follow up communication.

BRIEF SUMMARY

Embodiments of the present invention address the above needs and/or achieve other advantages by providing apparatuses (e.g., a system, computer program product and/or other devices) and methods for providing a customer service representative a unified representation of all customer relationships with respect to the entity. Specifically, the unified representation may include all accounts in arrears desired for recovery. The invention presents an overarching view of all customer relationships to a customer service representative prior to or immediately upon a customer communication. This allows the representative to make decision and take appropriate actions immediately based on the entire relationship with the customer when a customer communication is initiated.

The invention correlates all of the customer's relationships within an entity into one unified recovery system for a representative to review. In this way, the representative may be knowledgeable regarding all relationships the customer has with the entity. A relationship may include one or more accounts, loans, products, purchases, agreements, or contracts that a customer may have with the entity. Along with all customer relationships, the unified recovery system may take into consideration external factors on the communications and relationships. External factors may include laws, regulations, natural disaster occurrences, internal restrictions, or the like that may limit or prevent a customer from being contacted. As such, the invention provides a holistic customer service experience for a customer with accounts in arrears.

In some embodiments, the system may compile recovery products utilized across the entity into a single centralized unified recovery system. These recovery products may be internal or external dockets, ledgers, software, systems, or the like that are designed to initiate, monitor, and record any communication or payment associated with customer products in arrears. In this way, many different recovery products may be integrated into the one centralized unified recovery system. As such, a representative may access one centralized system to access all recovery products or systems associated with the entity.

In some embodiments, the system may compile customer relationship data. In this way, the system may compile all information that an entity may have associated with a customer. Customer relationship data may include, but is not limited to addresses and telephone numbers associated with a customer, other customer contact information, customer affiliates (such as friends, family, or the like), customer products, customer products in arrears, or other information associated with the customer's one or more accounts, loans, products, purchases, agreements, or contracts that a customer may have with the entity.

In some embodiments, the customer relationship data may be input into the unified recovery system to generate a single centralized location for customer relationships to be viewed and interacted with by a representative. Prior to communication with or when a communication is instigated with a customer, the representative will have access to the centralized data associated with the customer and the customer's accounts in arrears via an application associated with the unified recovery system.

The application presents customer information, prior communications, communication dispositions, current accounts, accounts in arrears, ranked importance of accounts in arrears to recover (such as primary, secondary, and relationship accounts), and the like. In this way, the representative may have information associated with all customer relationships within the entity easily accessible for his/her communication with the customer.

Furthermore, the unified recovery system may comprise a rules engine. In some embodiments, the rules associated with the rules engine may be manually input by a representative. In some embodiments, the rules associated with the rules engine may be automatically input. In some embodiments, the rules may be based on entity requirements or preferences. In some embodiments, the rules may be based on customer preferences. In yet other embodiments, the rules may be based on legal requirements or restrictions.

The rules may determine a primary account for recover associated with the customer, identify an appropriate representative for contacting a customer, warn or prohibit communications to a customer, or require disposition input after a communication. Determining a primary account in arrears to recover. Where the primary account is the account with payments in arrears that the system determines to be the one that must be recovered first. The primary account in arrears to recover includes selecting an account in arrears from a plurality of accounts associated with the customer that is most important for the entity to recover (i.e., which account of the plurality of accounts that the entity is most interested in collecting payments on first). Selecting an appropriate representative may be based on which representative has experience with that particular customer, knowledge with that particular primary account, or general expertise regarding a field associated with the primary account for recover. Warning or prohibiting communications to a customer may be based on internal restrictions, legal restrictions, or customer preferences. Finally, the rules may require the representative to provide disposition input with respect to a completed customer communication, such that the next representative to be in communication with the customer may have an indication as to the prior communications. The system may also track the customer communications. In this way, the system may track whether a communication went through to the customer, whom the representative spoke to, the duration of the communication, time of communication, date of communication, and the like.

In some embodiments, the system may provide additional components or features to aid in the initiation, communications, and payment associated with a customer account in arrears. In some embodiments, the invention may aid in the initiation of recovery of a payment in arrears. In this way, the system may determine accounts in arrears, contact information for a customer, customer guarantor, other individuals associated with the accounts, primary account for recovers, priority accounts in arrears, or the like.

In some embodiments, the invention may aid in the communication between a representative and a customer. In this way, the components may aid the representative in determining when to communicate, how to communicate, whom to communicate with, or the like regarding accounts in arrears.

In some embodiments, the invention may aid in recovering payments associated with customer accounts in arrears. In this way, the components may aid the representative with the type of payment acceptable for the account in the arrears, how to accept a payment, or the like.

Embodiments of the invention relate to systems, methods, and computer program products for recovering payments in arrears. First the invention identifies products with payments in arrears and associating the products with payments in arrears with one or more responsible customers. Next, the invention identifies customer relationships across an entity for the one or more responsible customers and correlate customer relationship data with the one or more responsible customers; determining recovery priority of products with payments in arrears. Then the invention determines rules that trigger restrictions on communication with the one or more responsible customers, wherein the rules are system defined, customer defined, or legally defined rules restricting communication with the one or more responsible customers. Next, the invention creates a representative application unique to each of the one or more responsible customers, wherein the representative application comprises the identified customer relationship data, the identified products with payments in arrears, and customer contact information for each of the one or more responsible customers. Subsequently, the invention authorizes an appropriate representative to communicate with one or more responsible customers, wherein the authorization is based at least in part on not triggering the rules that trigger restrictions on communication with the one or more responsible customers. Then the invention presents, automatically upon initiation of the communication with the one or more responsible customers, a disclosure message to the appropriate representative, wherein the disclosure message must be provided to the one or more responsible customer. Finally, the invention determines and storing a disposition of the communication with the one or more responsible customers.

In some embodiments, the invention further comprises preventing, automatically, a representative from communicating with one or more customers that satisfy the rules associated with communicating with the one or more responsible customers.

In some embodiments, the invention further comprises determining the appropriate representative to communicate with one or more responsible customers based at least in part on the appropriate representative's experience and expertise regarding the product with payments in arrears or the responsible customer.

In some embodiments, the disposition of the communication with the one or more responsible customers further comprises the date, time, duration, and outcome of the communication with the one or more responsible customers.

In some embodiments, determining priority of products with payments in arrears is based at least in part on account level variables and scoring metrics, where account level variables include customer variables disclosed in the customer relationship and scoring metrics include rating the products with payments in arrears in importance of recovery.

In some embodiments, system defined rules include entity established restrictions on communications with the one or more responsible customers based on customer location, wherein customer defined rules include customer established restrictions on time or means of communications with the one or more responsible customers, and wherein legally defined rules include legal established restrictions on time, place, and manner of communication with the one or more responsible customers.

In some embodiments, the representative application is an interface presented to the representative based on the representative's experience and expertise regarding the product with payments in arrears or based on an incoming communication from one or more responsible customers. In some embodiments, the one or more responsible customers are customers that are a primary, secondary, or guarantor for the product with payments in arrears.

According to embodiments of the invention, a system for determining an appropriate course of action for a representative working to recover payment in arrears includes a memory device with computer-readable program code stored thereon; a communication device; and a processing device operatively coupled to the memory device and the communication device. The processing device is configured to execute the computer-readable program code to determine at least one customer preference regarding limitation of representative-customer interactions; and, based on the at least one customer preference, present assistance information to the representative before or during the representative-customer interaction, the assistance information configured to at least one of inform the representative of the at least one customer preference, present the representative with at least one proposed question for presentation to the customer, or present the representative with at least one proposed method for representative-customer interaction.

In some embodiments, the assistance information is configured to present the representative with at least one proposed question for presentation to the customer; and the at least one proposed question comprises a question based on the at least one customer preference regarding limitation of representative-customer interactions and intended to confirm a level of limitation of representative-customer interaction represented by the at least one customer preference. In some such embodiments, the processing device is further configured to execute the computer-readable program code to receive customer feedback in response to being presented a question based on the at least one proposed question; and, in the event the level of limitation of representative-customer interaction represented by the at least one customer preference is not confirmed, present the representative with at least one additional proposed question for presentation to the customer based on both the level of limitation of representative-customer interaction and the customer's response to the question.

In some embodiments, the assistance information is configured to present the representative with at least one proposed method for representative-customer interaction; and the at least one method for representative-customer interaction comprises at least one proposed question based on the at least one customer preference regarding limitation of representative-customer interactions.

In some embodiments, the assistance information is configured to present the representative with at least one proposed method for representative-customer interaction; and the at least one method for representative-customer interaction comprises information regarding one or more levels of limitation of representative-customer interaction that correspond with the customer preference regarding limitation of representative-customer interactions for potential presentation of one or more of the one or more levels of limitation of representative-customer interaction for approval from the customer. In some such embodiments, the processing device is further configured to execute the computer-readable program code to receive a response from the customer regarding approval of a level of limitation of representative-customer interaction; and store the level of limitation of representative-customer interaction in any relevant system for subsequent retrieval by other representatives.

In some embodiments, the processing device is further configured to execute the computer-readable program code to receive information regarding any customer contact by the representative; and store the information in any relevant system for subsequent retrieval by other representatives or to ensure compliance with customer contact rules.

According to embodiments of the invention, a computer program product for determining an appropriate course of action for a representative working to recover payment in arrears includes at least one non-transitory computer-readable medium having computer-readable program code embodied therein. The computer-readable program code includes code to determine at least one customer preference regarding limitation of representative-customer interactions; and code to, based on the at least one customer preference, present assistance information to the representative before or during the representative-customer interaction, the assistance information configured to at least one of inform the representative of the at least one customer preference, present the representative with at least one proposed question for presentation to the customer, or present the representative with at least one proposed method for representative-customer interaction.

In some embodiments, the assistance information is configured to present the representative with at least one proposed question for presentation to the customer; and the at least one proposed question comprises a question based on the at least one customer preference regarding limitation of representative-customer interactions and intended to confirm a level of limitation of representative-customer interaction represented by the at least one customer preference. In some such embodiments, the computer program code further comprises code to receive customer feedback in response to being presented a question based on the at least one proposed question; and code to, in the event the level of limitation of representative-customer interaction represented by the at least one customer preference is not confirmed, present the representative with at least one additional proposed question for presentation to the customer based on both the level of limitation of representative-customer interaction and the customer's response to the question.

In some embodiments, the assistance information is configured to present the representative with at least one proposed method for representative-customer interaction; and the at least one method for representative-customer interaction comprises at least one proposed question based on the at least one customer preference regarding limitation of representative-customer interactions.

In some embodiments, the assistance information is configured to present the representative with at least one proposed method for representative-customer interaction; and the at least one method for representative-customer interaction comprises information regarding one or more levels of limitation of representative-customer interaction that correspond with the customer preference regarding limitation of representative-customer interactions for potential presentation of one or more of the one or more levels of limitation of representative-customer interaction for approval from the customer. In some such embodiments, the computer program code further comprises code to receive a response from the customer regarding approval of a level of limitation of representative-customer interaction; and code to store the level of limitation of representative-customer interaction in any relevant system for subsequent retrieval by other representatives.

In some embodiments, the computer program code further comprises code to receive information regarding any customer contact by the representative; and code to store the information in any relevant system for subsequent retrieval by other representatives or to ensure compliance with customer contact rules.

According to embodiments of the invention, a computer-implemented method for presenting relevant questions to a representative during a representative-customer interaction includes determining, by a processing device, at least one customer preference regarding limitation of representative-customer interactions; and, based on the at least one customer preference and by a processing device, present assistance information to the representative before or during the representative-customer interaction, the assistance information configured to at least one of inform the representative of the at least one customer preference, present the representative with at least one proposed question for presentation to the customer, or present the representative with at least one proposed method for representative-customer interaction. In some such embodiments, the assistance information is configured to present the representative with at least one proposed question for presentation to the customer; and the at least one proposed question comprises a question based on the at least one customer preference regarding limitation of representative-customer interactions and intended to confirm a level of limitation of representative-customer interaction represented by the at least one customer preference. In some of these embodiments, the method also includes receiving customer feedback in response to being presented a question based on the at least one proposed question; and, in the event the level of limitation of representative-customer interaction represented by the at least one customer preference is not confirmed, presenting the representative with at least one additional proposed question for presentation to the customer based on both the level of limitation of representative-customer interaction and the customer's response to the question.

In some embodiments, the assistance information is configured to present the representative with at least one proposed method for representative-customer interaction; and the at least one method for representative-customer interaction comprises at least one proposed question based on the at least one customer preference regarding limitation of representative-customer interactions.

In some embodiments, the assistance information is configured to present the representative with at least one proposed method for representative-customer interaction; and the at least one method for representative-customer interaction comprises information regarding one or more levels of limitation of representative-customer interaction that correspond with the customer preference regarding limitation of representative-customer interactions for potential presentation of one or more of the one or more levels of limitation of representative-customer interaction for approval from the customer. In some such embodiments, the method also includes receiving a response from the customer regarding approval of a level of limitation of representative-customer interaction; and storing the level of limitation of representative-customer interaction in any relevant system for subsequent retrieval by other representatives.

In some embodiments, the method also includes receiving information regarding any customer contact by the representative; and storing the information in any relevant system for subsequent retrieval by other representatives or to ensure compliance with customer contact rules.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
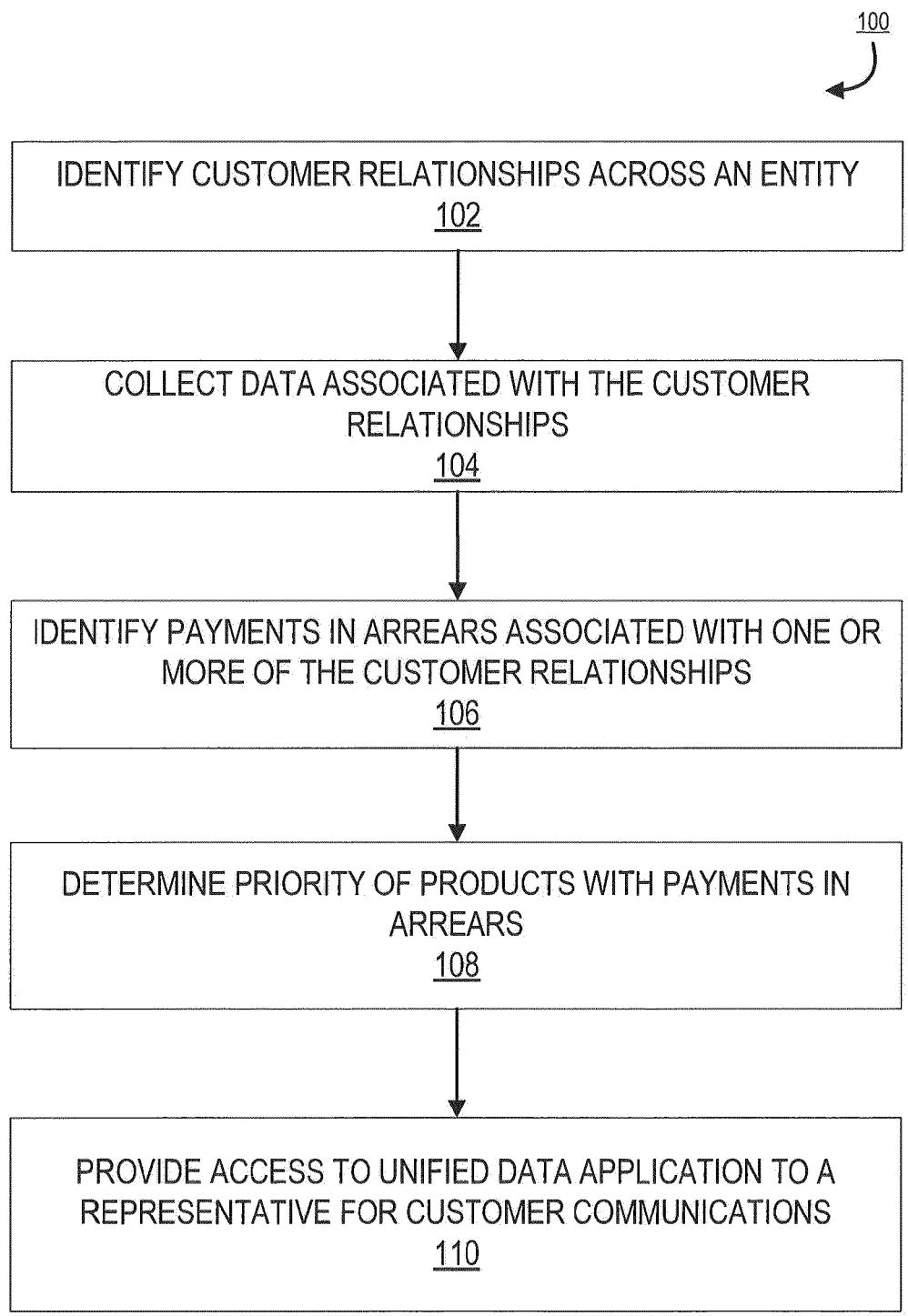
Figure 2:
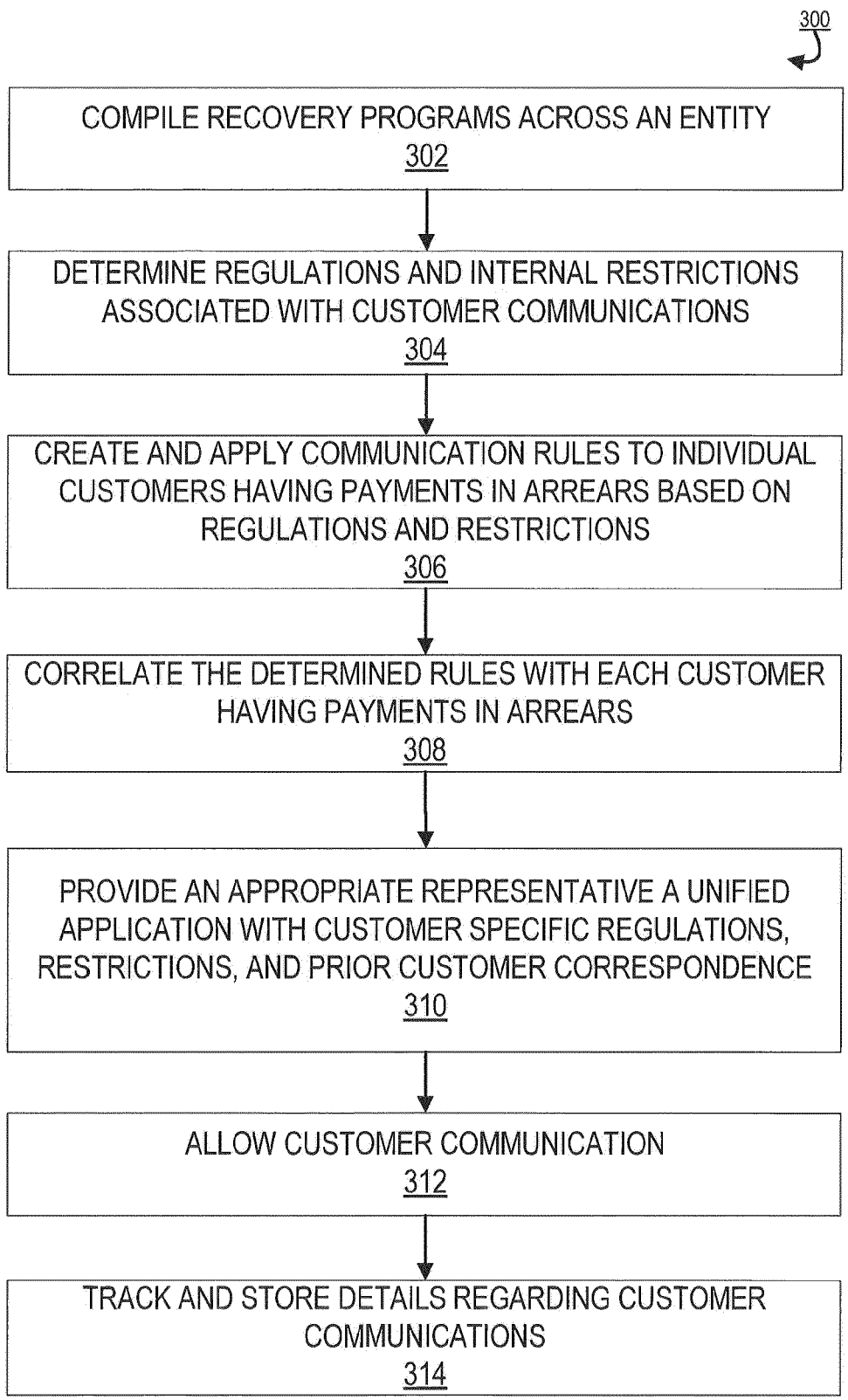
Figure 3:
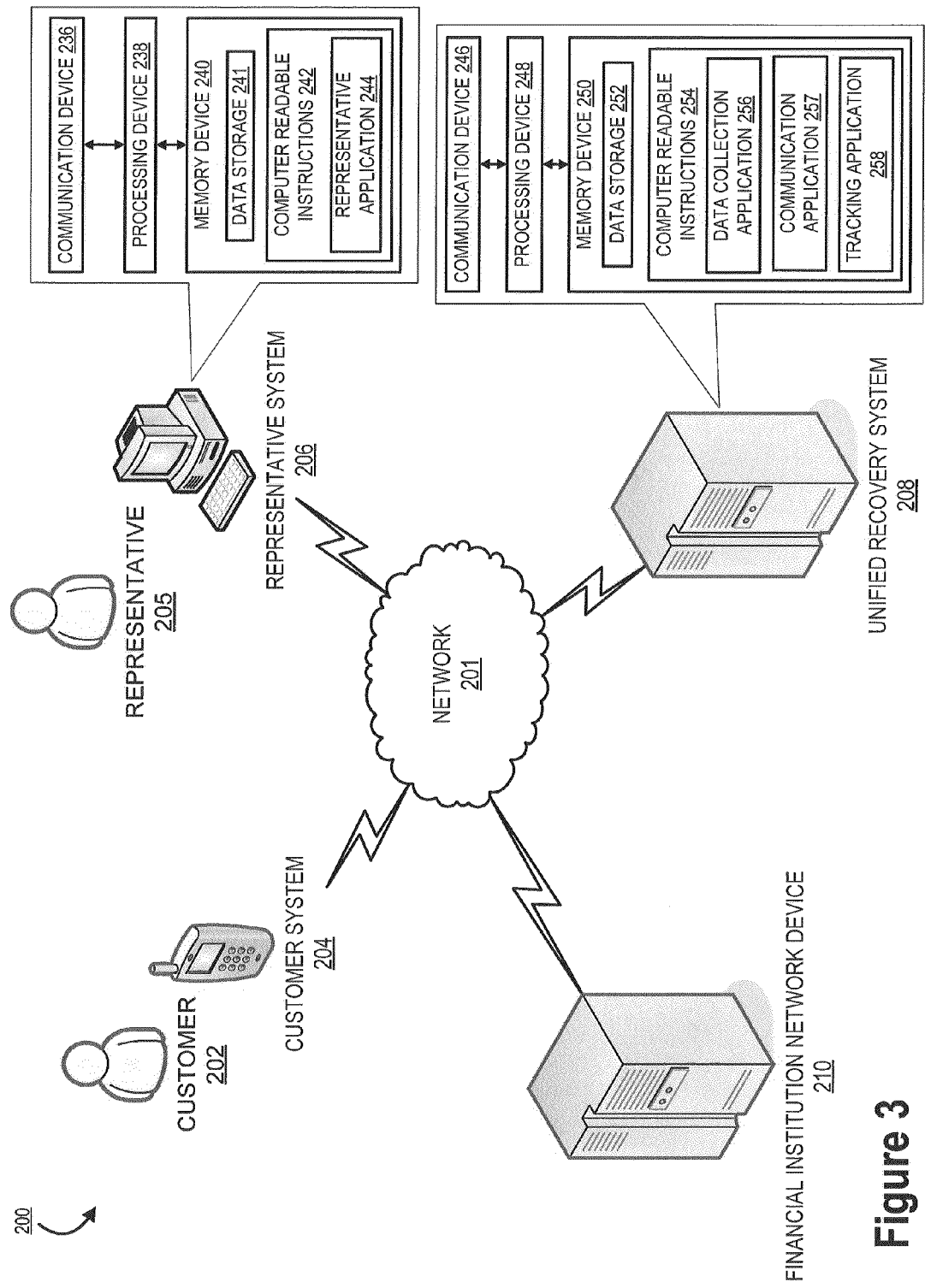
Figure 4:
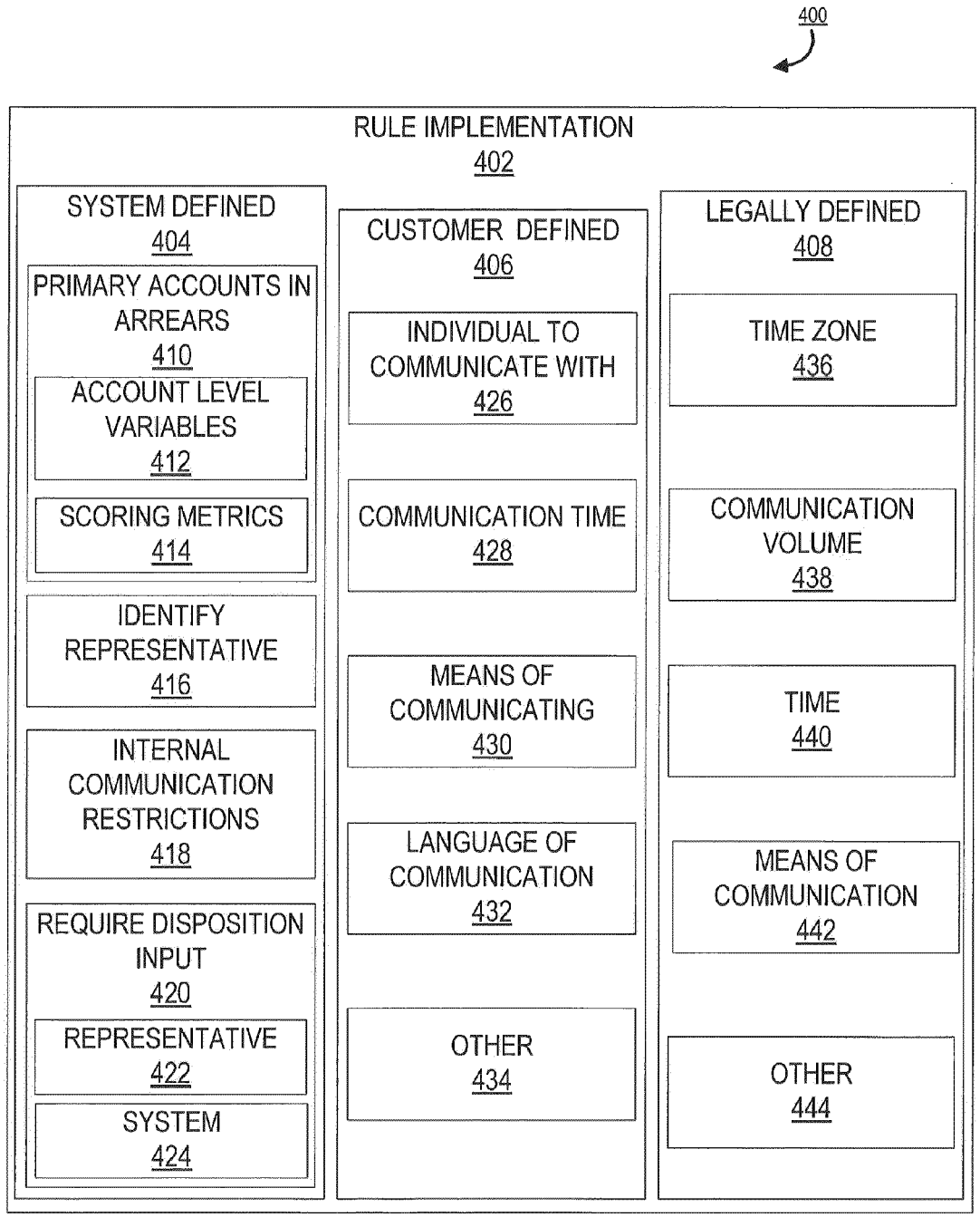
Figure 5:
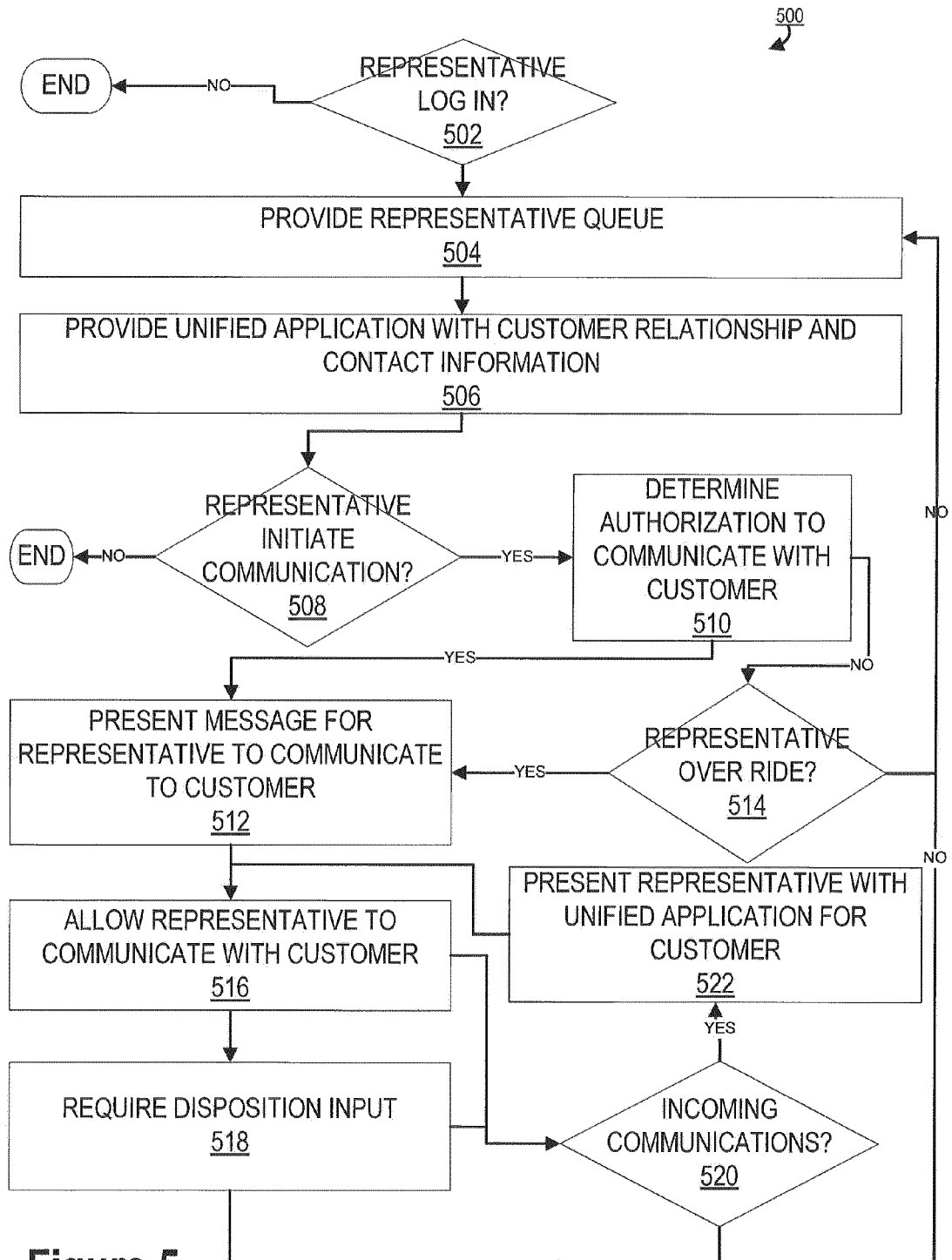
Figure 8:
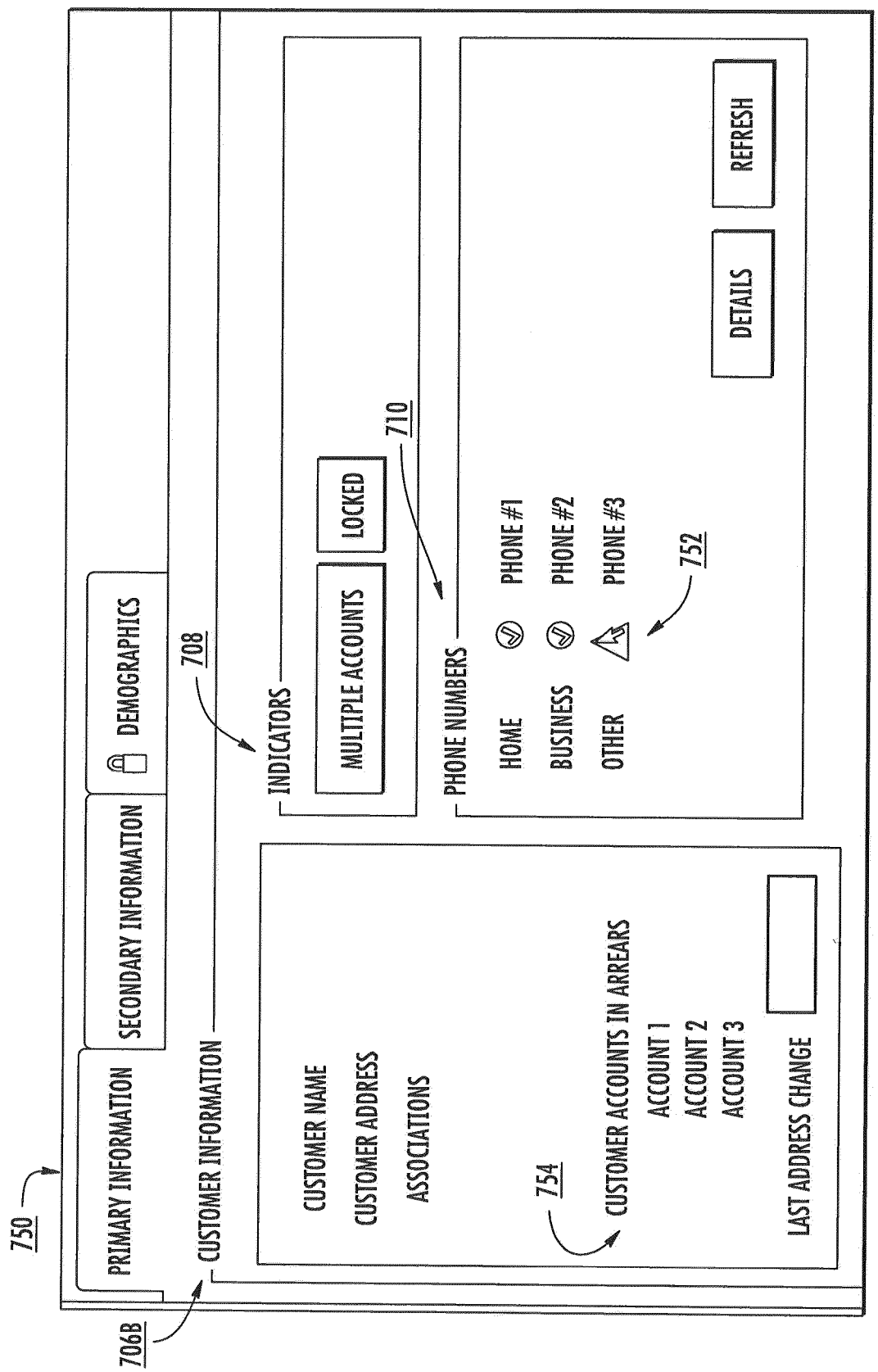
Figure 10A:
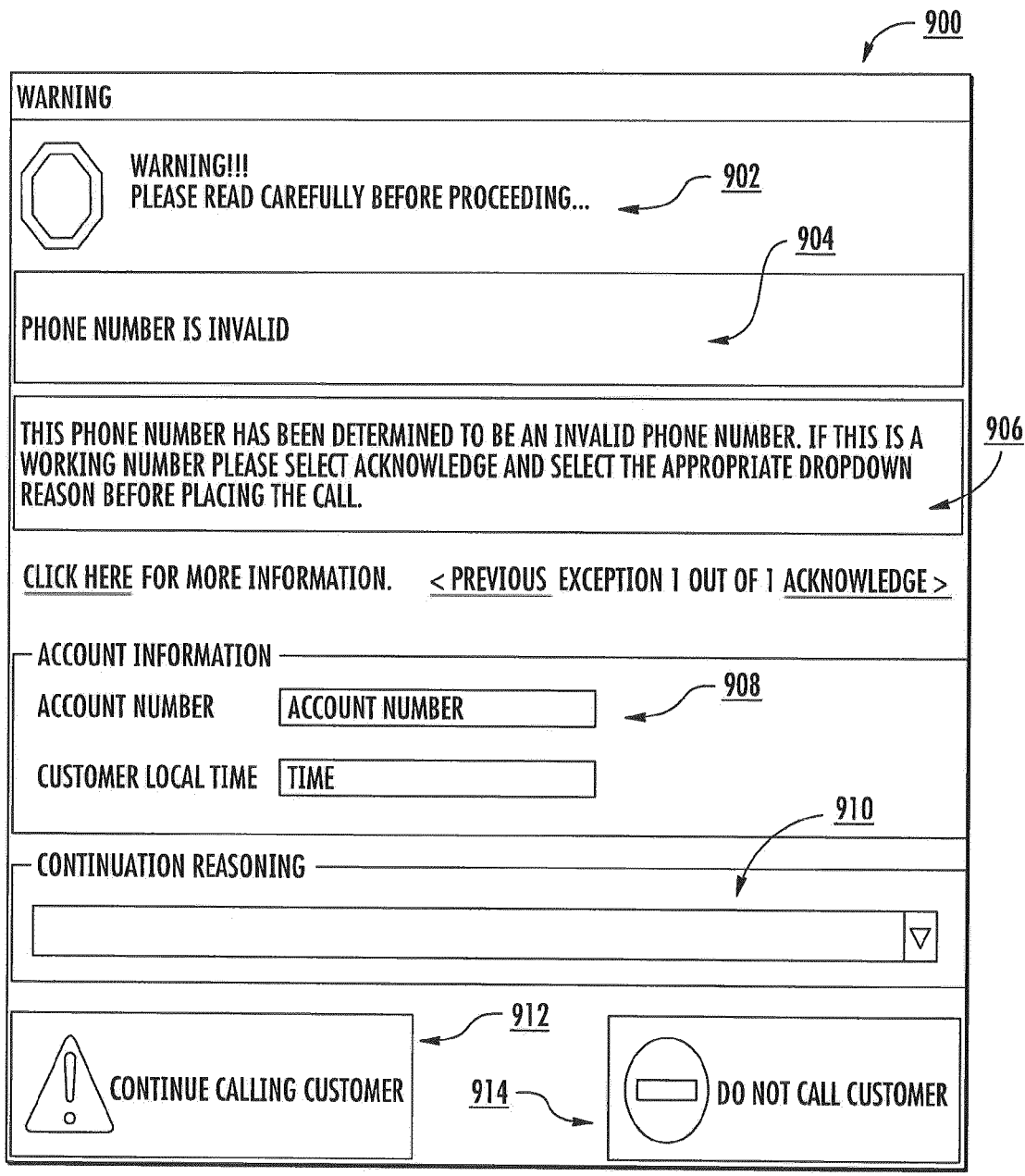
Figure 10B:
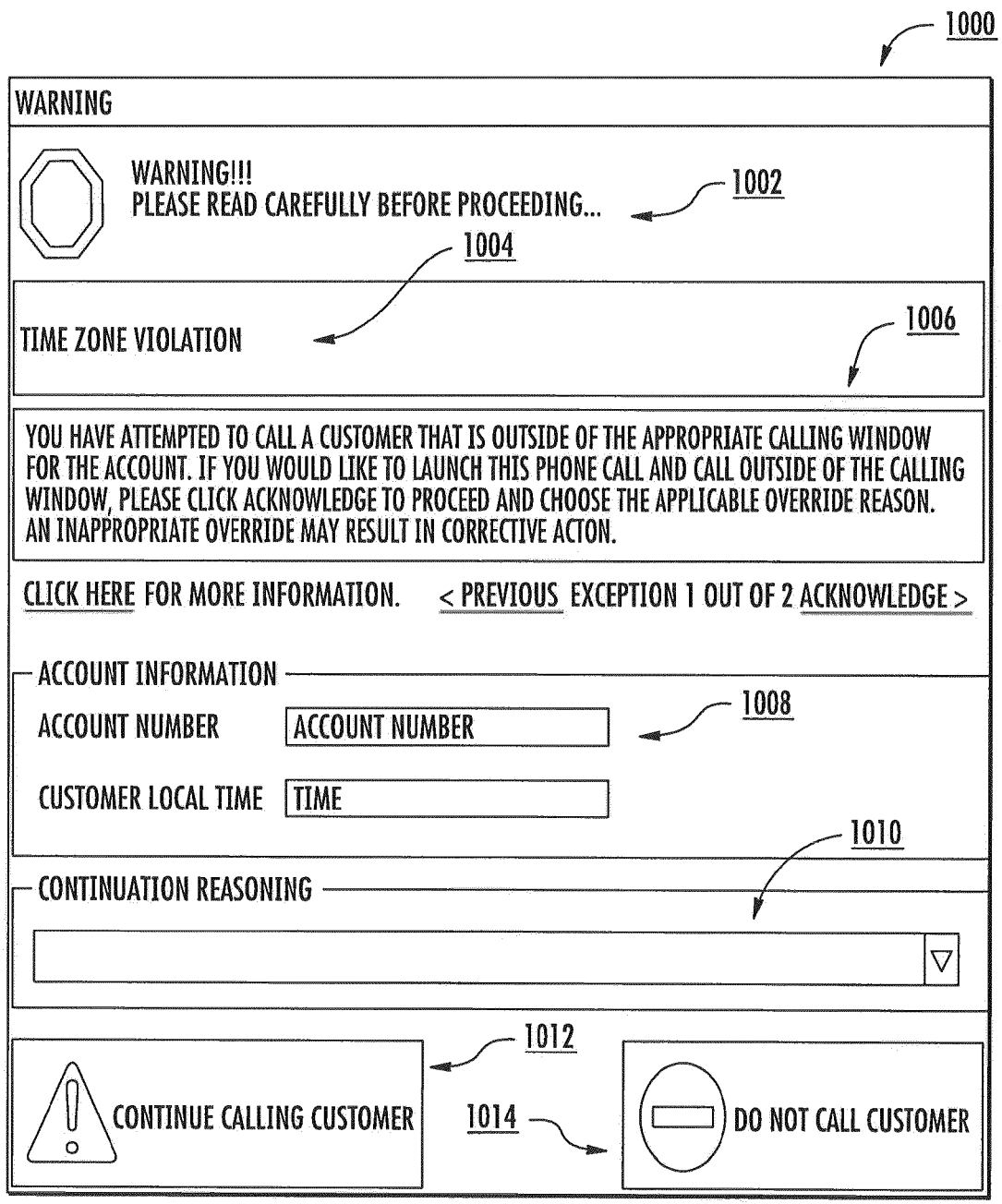
Figure 11:
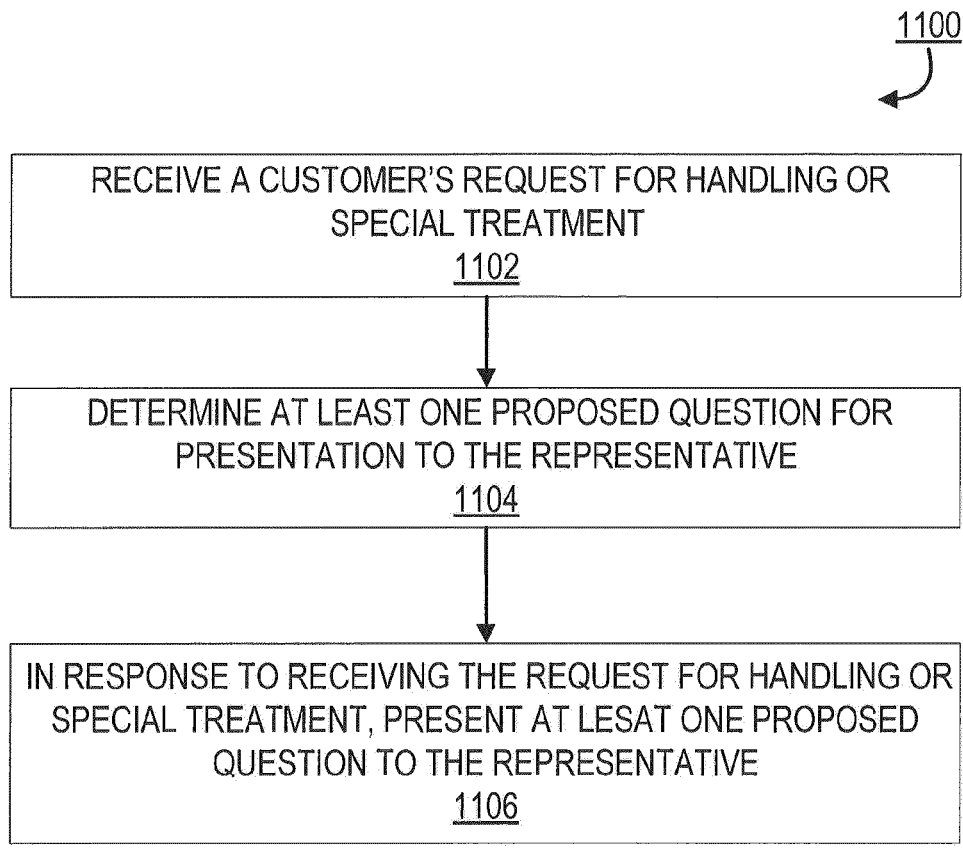
Figure 12:
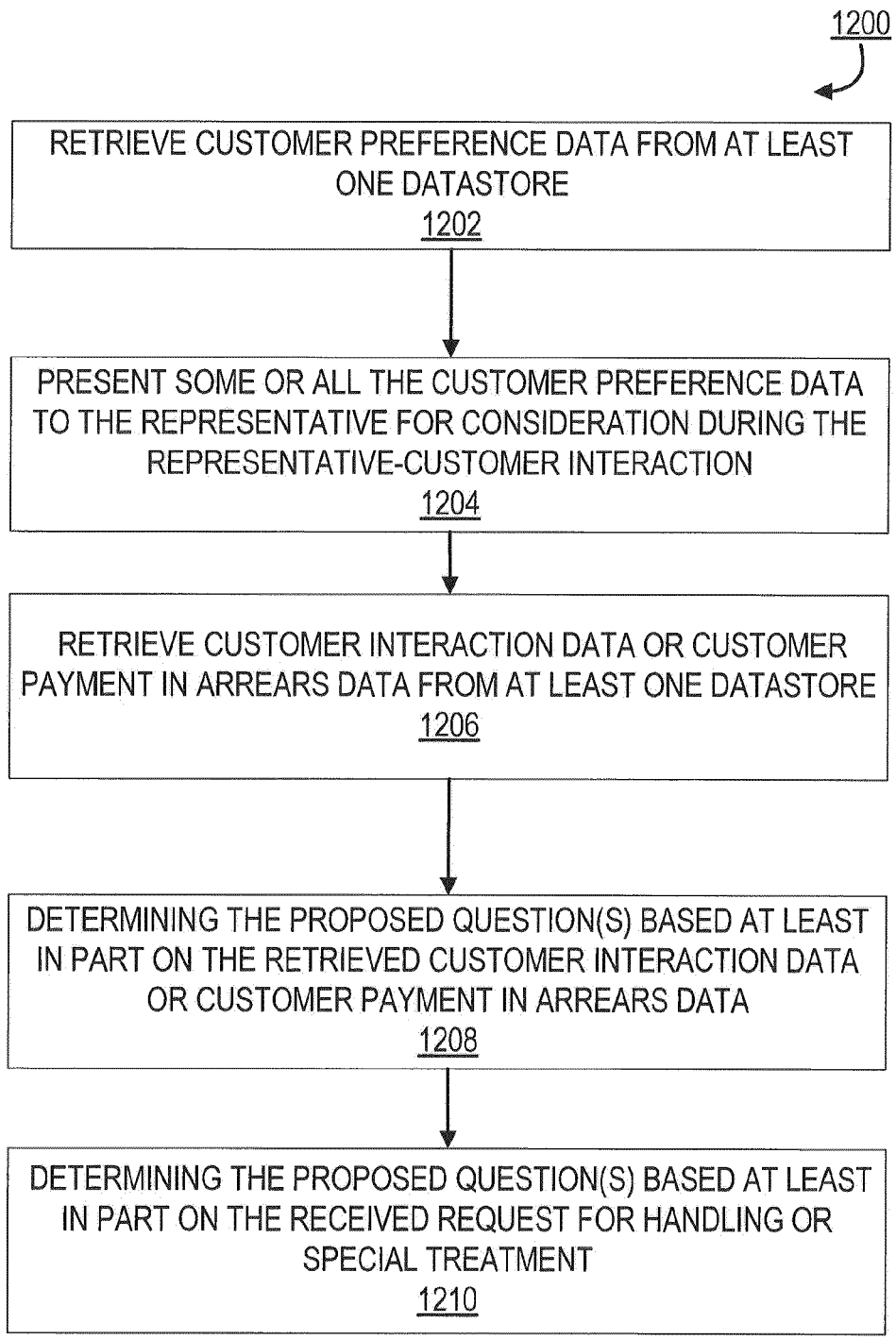
Figure 13:
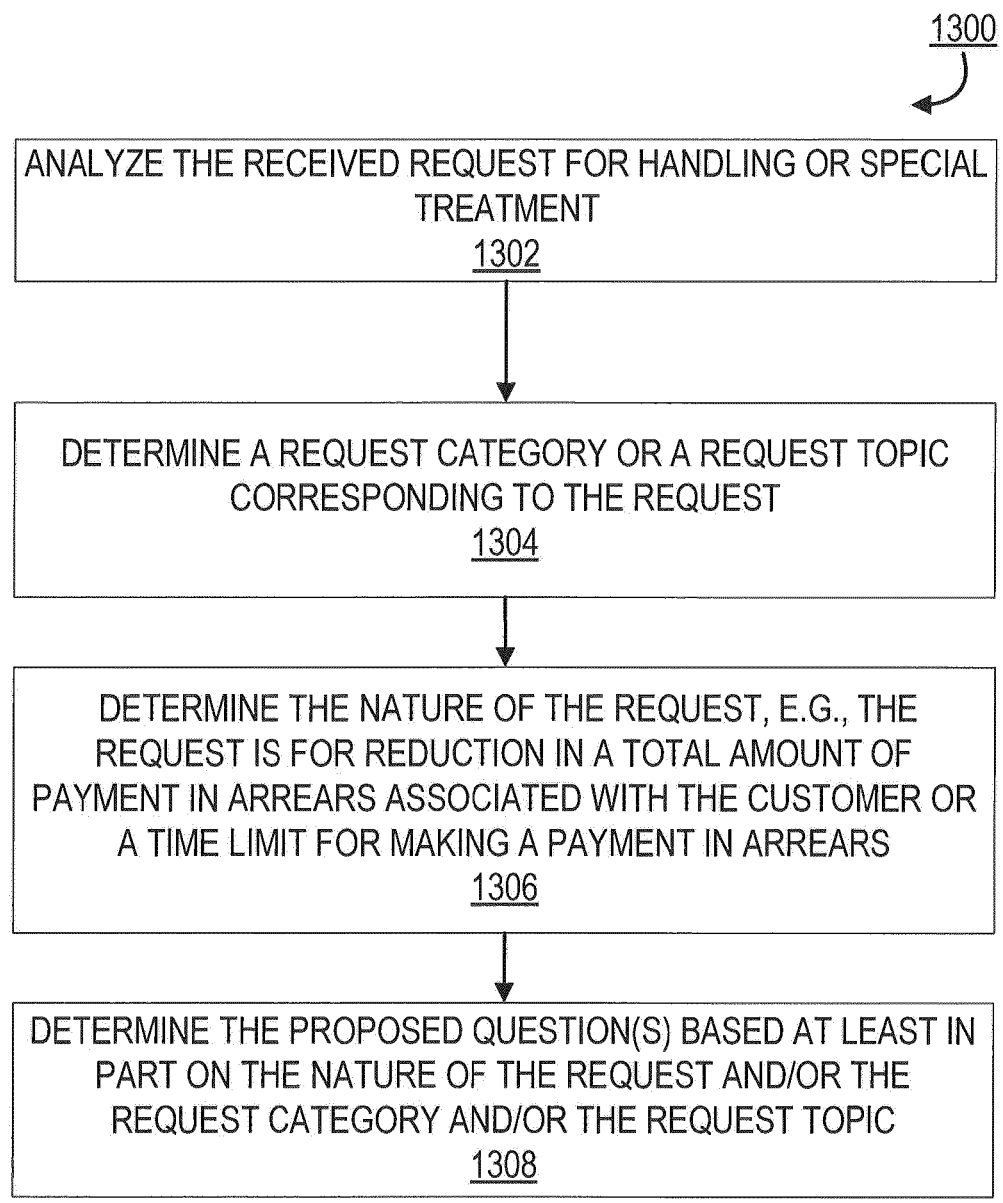
Figure 14:
Figure 15:
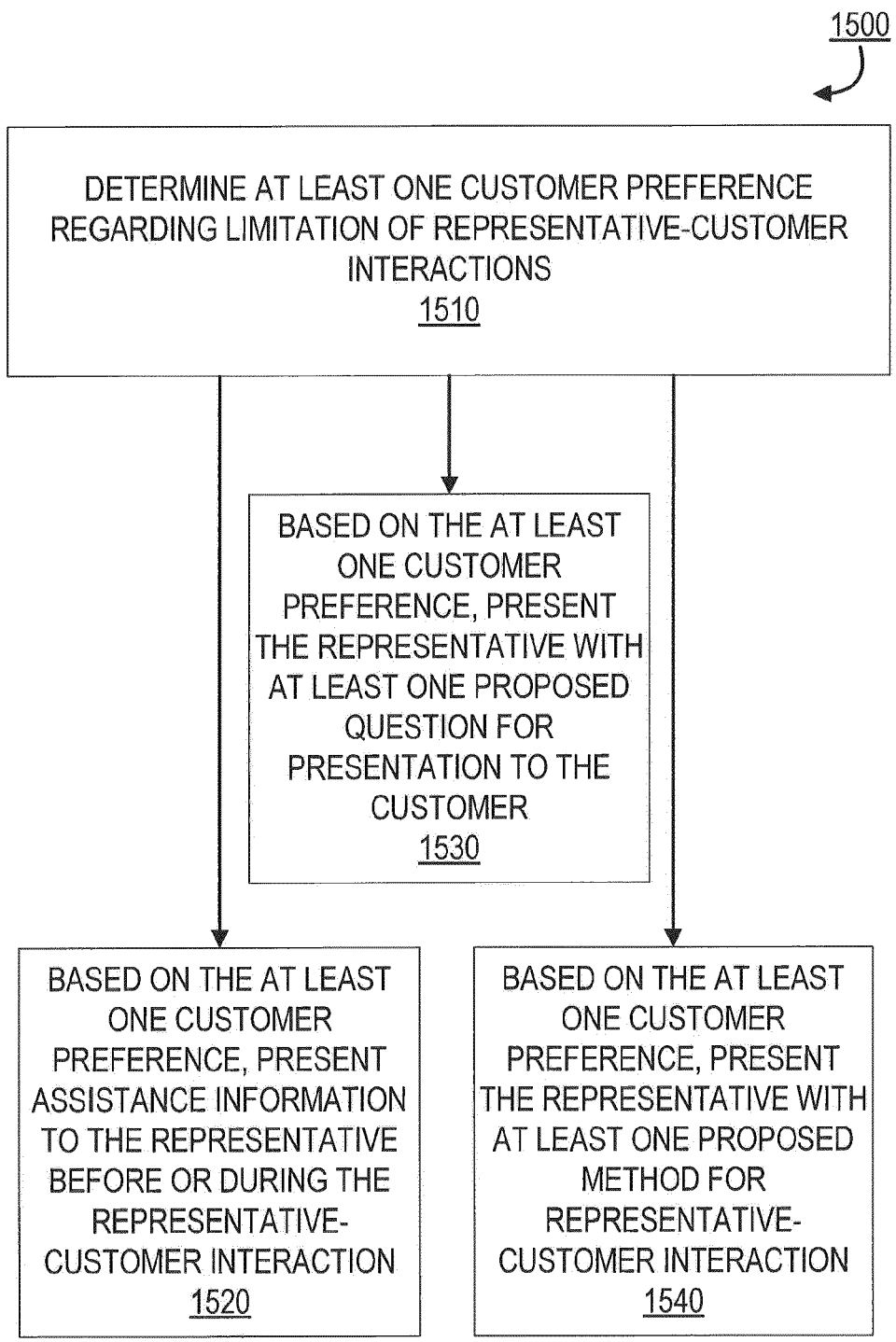
Figure 16:
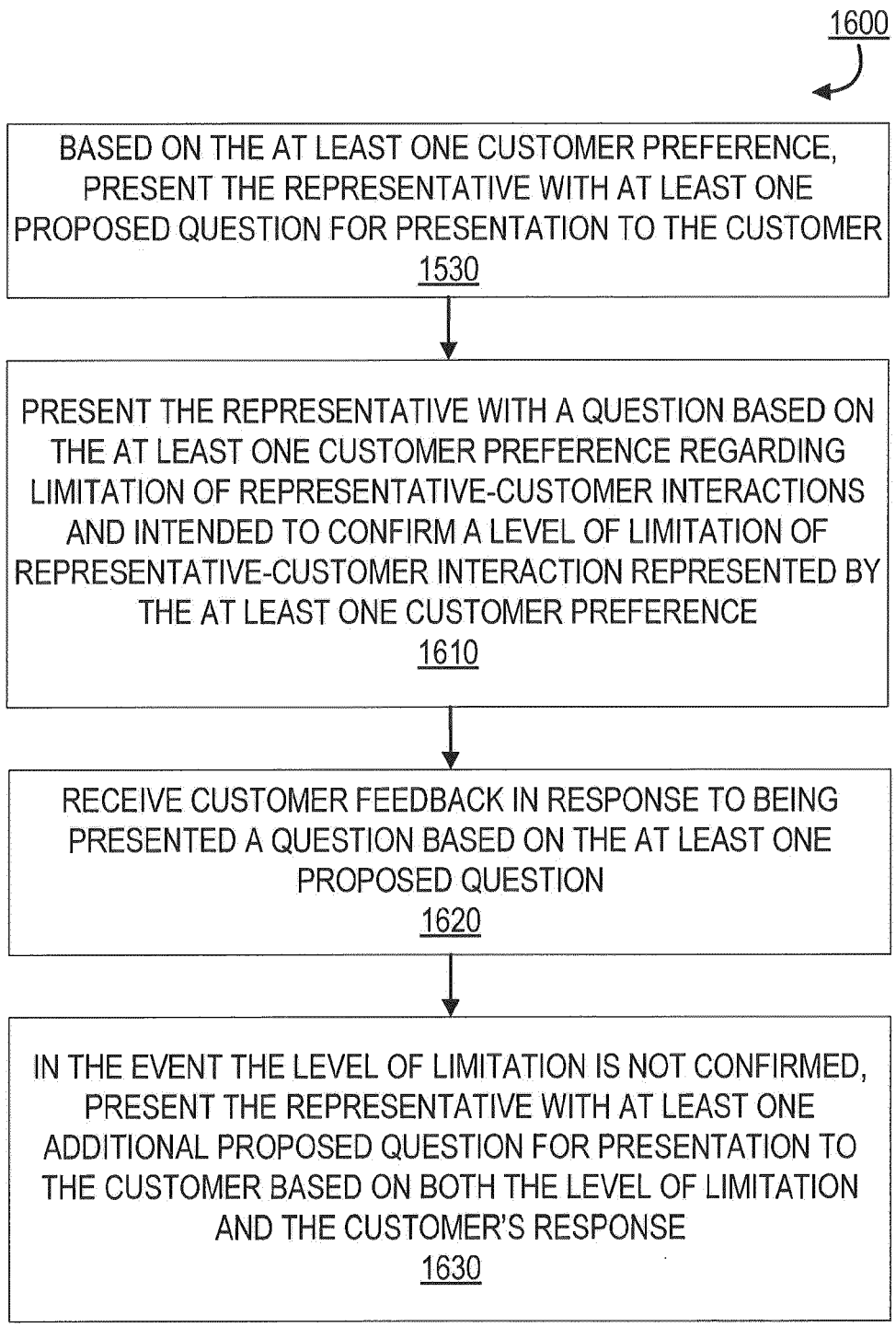
Figure 17:
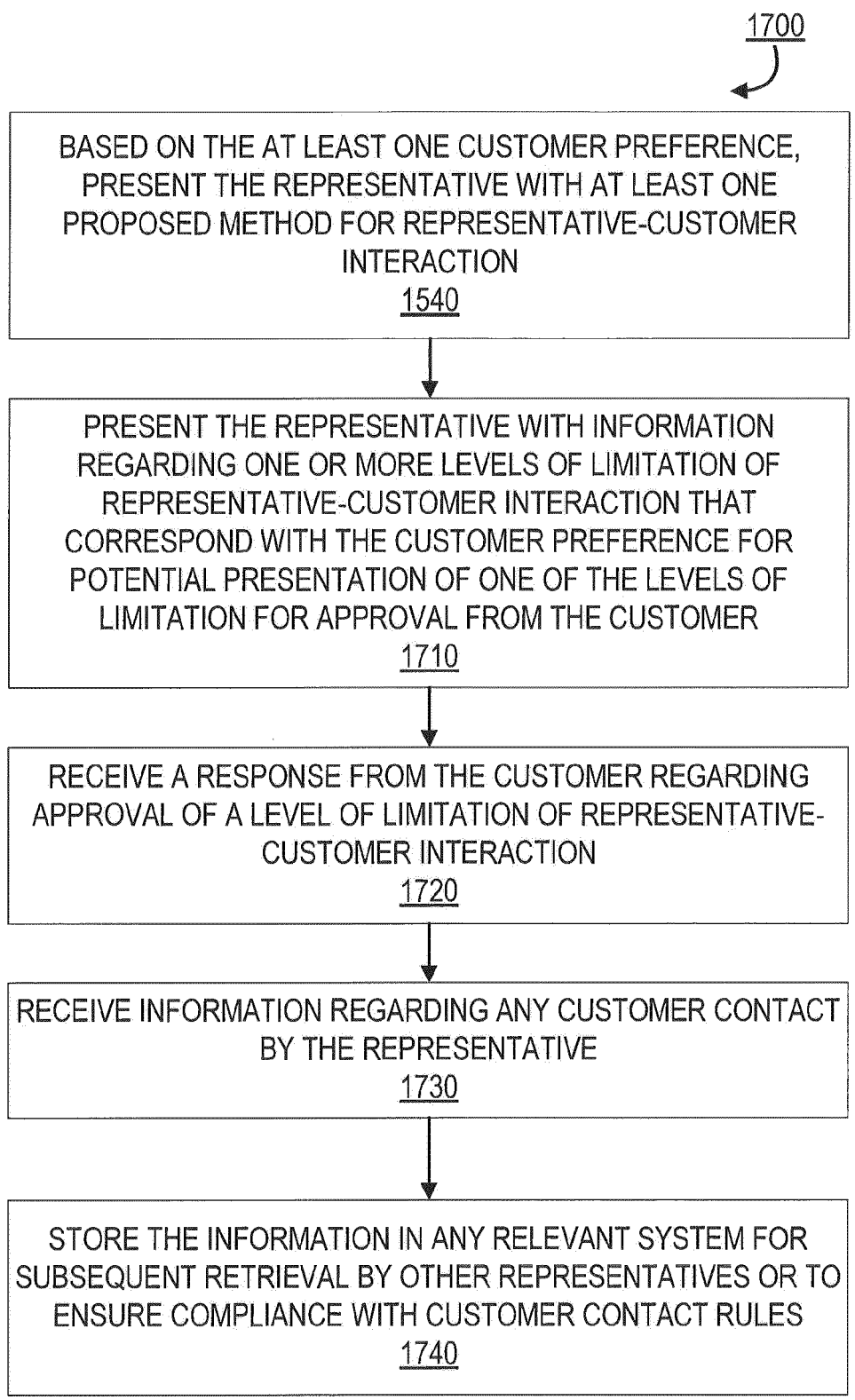

Having thus described embodiments of the invention in general terms, reference will now be made to the accompanying drawings, wherein:

FIG. 1 provides a high level process flow illustrating the unified recovery process, in accordance with one embodiment of the present invention;

FIG. 2 provides a high level process flow illustrating the unified recovery system process, in accordance with one embodiment of the present invention;

FIG. 3 provides a unified recovery system environment, in accordance with one embodiment of the present invention;

FIG. 4 provides a process map illustrating rules implementation for the unified recovery system, in accordance with one embodiment of the present invention;

FIG. 5 provides a process map illustrating a representative use of the unified recovery system, in accordance with one embodiment of the present invention;

FIG. 6 provides an interface illustrating a representative queue, in accordance with one embodiment of the present invention;

Figure 7:
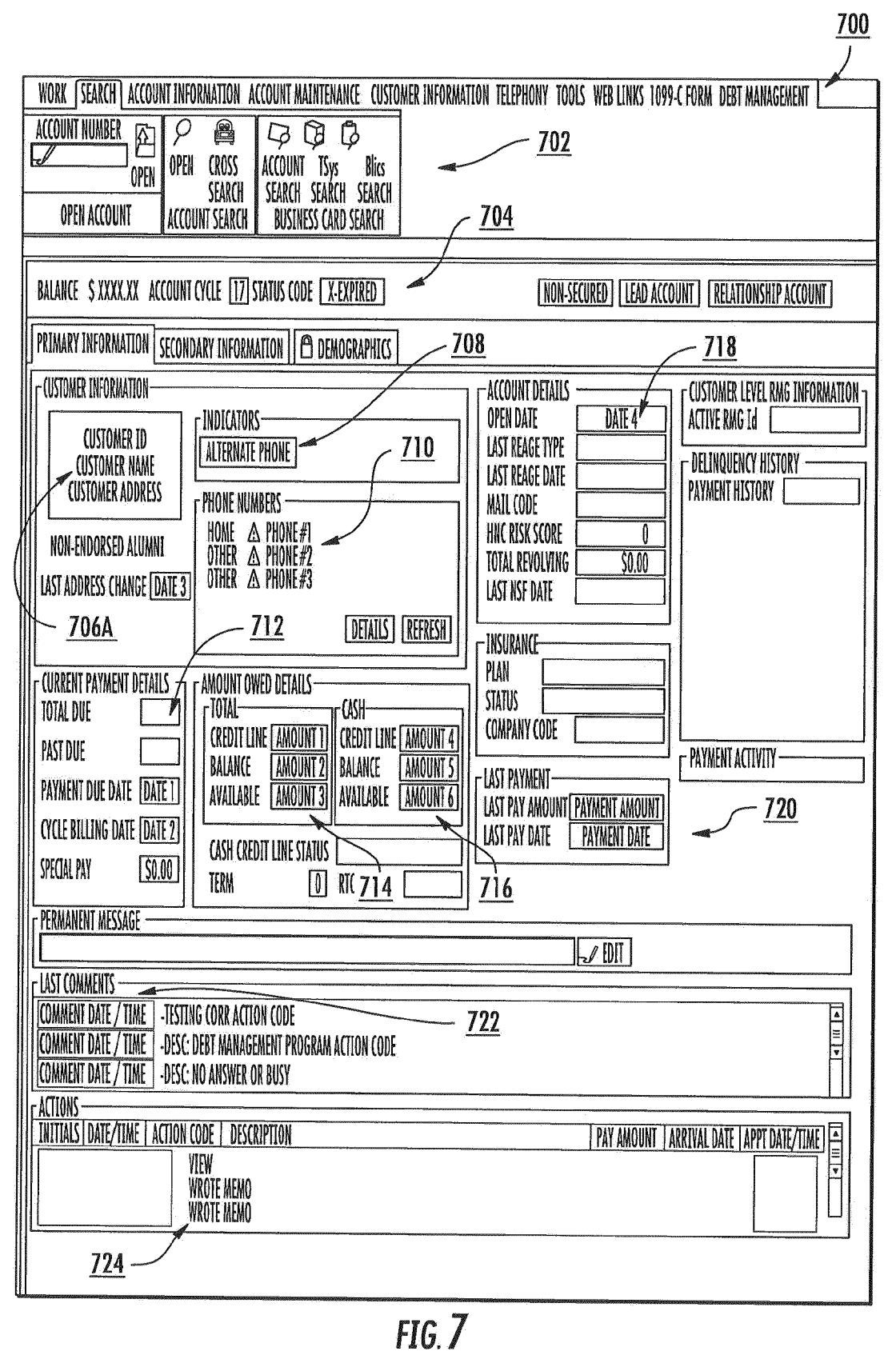

FIG. 7 provides an interface illustrating the unified application with customer relationships, in accordance with one embodiment of the present invention;

FIG. 8 provides an expanded view of the customer information section of the unified application with customer relationships, in accordance with one embodiment of the present invention;

Figure 9:
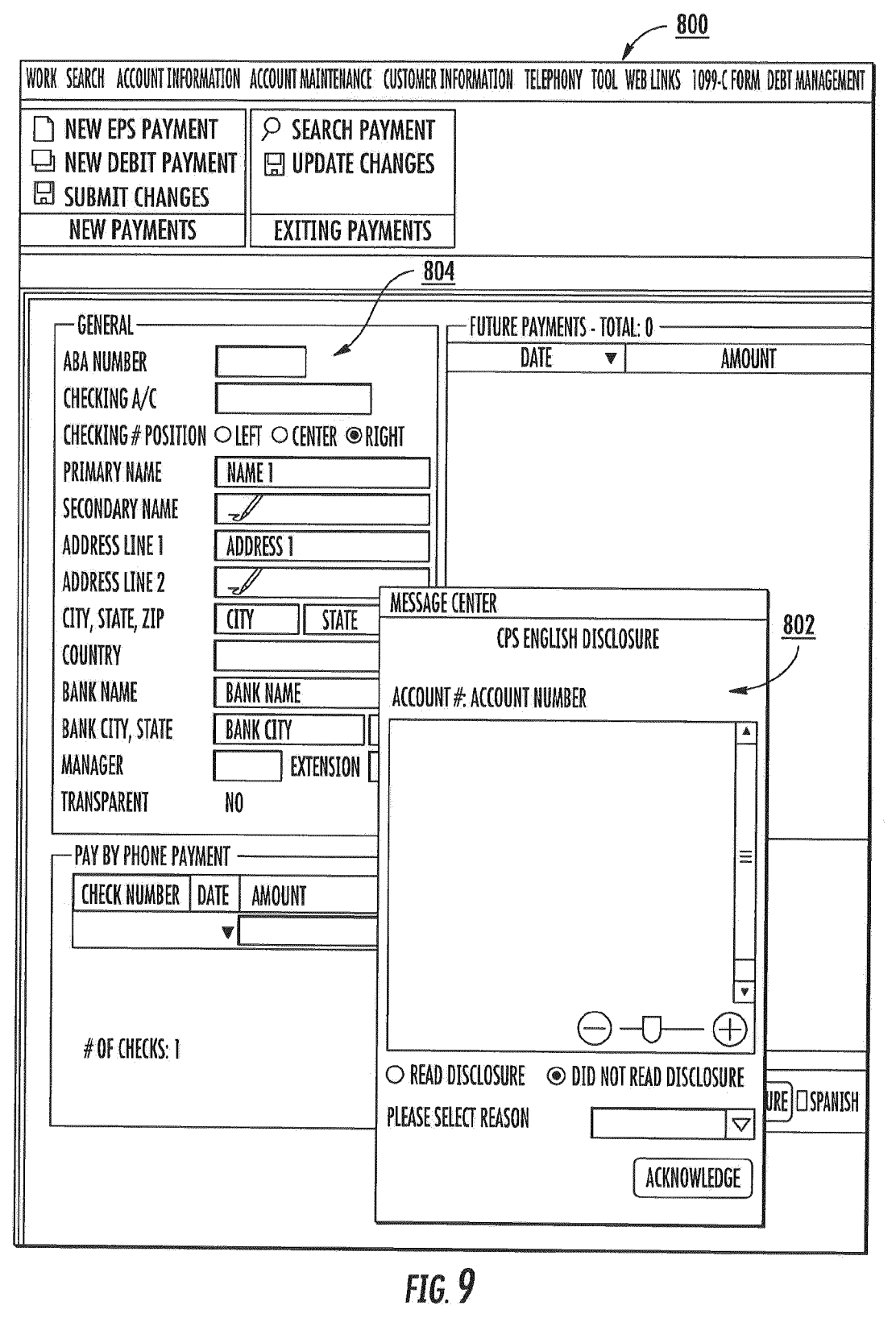

FIG. 9 provides an example interface illustrating a message center prior to customer communications on the unified application, in accordance with one embodiment of the present invention;

FIG. 10A provides an interface illustrating a warning message presented to the representative, in accordance with one embodiment of the present invention;

FIG. 10B provides an interface illustrating a warning message presented to the representative, in accordance with one embodiment of the present invention;

FIG. 11 provides a process map illustrating a method for presenting relevant questions to a representative during a representative-customer interaction according to embodiments of the invention;

FIG. 12 provides a process map illustrating a method for presenting relevant questions to a representative during a representative-customer interaction according to embodiments of the invention;

FIG. 13 provides a process map illustrating a method for presenting relevant questions to a representative during a representative-customer interaction according to embodiments of the invention;

FIG. 14 provides an illustration of a screenshot of a representative interface for use with a system for determining an appropriate course of the representative working to recover payment in arrears;

FIG. 15 provides a process map illustrating a method for determining an appropriate course of the representative working to recover payment in arrears;

FIG. 16 provides a process map illustrating a method for determining an appropriate course of the representative working to recover payment in arrears; and FIG. 17 provides a process map illustrating a method for determining an appropriate course of the representative working to recover payment in arrears.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Furthermore, the term "product" or "account" as used herein may include any financial product, service, or the like that may be provided to a customer from an entity that subsequently requires payment. A product may include an account, credit, loans, purchases, agreements, or the like between an entity and a customer. The term "relationship" as used herein may refer to any products, communications, correspondences, information, or the like associated with a customer that may be obtained by an entity while working with a customer. Customer relationship data may include, but is not limited to addresses associated with a customer, customer contact information, customer associate information, customer products, customer products in arrears, or other information associated with the customer's one or more accounts, loans, products, purchases, agreements, or contracts that a customer may have with the entity.

Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that utilized accounts in arrears recovery.

FIG. 1 illustrates a high level process flow for the unified recovery process 100, in accordance with one embodiment of the present invention, which will be discussed in further detail throughout this specification with respect to FIG. 2 through FIG. 10B. As illustrated in block 102, the process 100 begins with identifying customer relationships across an entity. In this way, the system may identify all products that a customer may have with the entity across one or more lines of business within the entity. As such, addresses, affiliates, phone numbers, customer products, products with payments that are in arrears, and any other information that may be associated with a single customer may be gathered across the lines of business of an entity. Next, as illustrated in block 104, the data associated with the customer relationships may be collected and compiled in association with the customer. As such, all relationship data may be stored in association with a customer including those products and/or accounts that are in arrears.

The next step in the process 100, as illustrated in block 106, is to identify payments in arrears associated with the customer. As such, the products or accounts that have payments in arrears that are associated with that particular customer are identified. A product or account with a payment in arrears may be qualified as being in arrears based on the entity itself and/or agreements for payment between the customer and the entity. For example, after the due date for payment for the product or after a predetermined number of days after the due date, the product may be considered by the entity to be in arrears. Furthermore, the accounts or products with payments in arrears for people affiliated with that customer, such as when the customer is a guarantor for the associate or the like, may also be identified by the system. People affiliated with the customer may include friends, family, or the like associated with the customer.

As illustrated in block 108, the system determines the priority of the products with payments in arrears. In this way, the system may determine which products in arrears should take priority over the other products for purposes of recovery of payments. The primary account for recover is the account or product that the entity has identified as having payment in arrears that is the one which needs to be recovered first. This may be based on entity determination, interest rate, amount, importance, or the like. As such, the system may identify the products with payments in arrears that are the most important to recover first ahead of the other payment products. Thus, the representative may focus on recovering payments for that identified product. Finally, as illustrated in block 110, the process 100 continues by providing access to a unified application to a representative for customer communications. The unified application provides the representative with an across the entity view of the customer's relationship with the entity as well as information associated with the primary account and other accounts with payments in arrears. Finally, the unified application also provides information associated with prior customer communications. As such, the invention provides a holistic customer service experience for a customer with accounts in arrears.

FIG. 2 illustrates a high level process flow for the unified recovery system process 300, in accordance with one embodiment of the present invention. The process 300 describes a high level of the unified recovery system's steps to providing a representative with the unified application to aid in payment in arrears recovery. First, as illustrated in block 302, the system compiles the various recovery programs across the entity. In this way, all recovery programs may be centralized, such that the representative can log into a single system. This eliminates requiring the representative to log into a plurality of software programs in order to view and understand all relationships a customer has with the entity.

Next, as illustrated in block 304, the system may determine regulations and internal restrictions associated with individual customer communications. Regulations may include laws or other regulations regarding the time of day a customer may be contacted, the amount of times within a given day/week/month that a customer may be contacted, a telephone number in which a customer may be contacted, or the like. As such, the system ensures that the representative is following all regulations and/or laws regarding the contacting of customers with products having payments in arrears. Internal regulations may include any rule that an entity may put in place to restrict or warn a representative prior to the representative contacting a customer or during the representative's communication with the customer. For example, an internal regulation may be set based on a customer communication preference, such as a specific telephone number to utilize for communications with the customer. In another example, the entity may identify an event that requires the entity to delay in communicating with a customer regarding a product with a payment in arrears (e.g., a natural disaster in the geographic are where the customer is located or another known event that may interfere with a customer providing payment).

In some embodiments, the regulations or restrictions may, in some instances, be overridden by the representative. In this way, the representative may still contact the customer even if a regulation or restriction is in place. The representative may need to input a reason for overriding the regulation or restriction. In some embodiments, the regulation or restriction may not be overridden by any representative. In this way, the system will not allow the representative to communicate with the customer at that time. In some embodiments, no regulation or restriction may be placed on a customer communication. As such, the representative may contact the customer at any time.

Next, as illustrated in block 306 the system may utilize the regulations and restrictions to create rules for customer communications. These rules may be created and applied to a customer on a customer-by-customer basis. In this way, each customer, based on the customer's location, telephone number, or the like, may have a unique set of rules applied for him/her based on regulations and/or restrictions that may apply to the customer having payments in arrears for products. Next, once the rules have been created and applied in block 306, the determined rules may be correlated with each individual customer having payments in arrears, as illustrated in block 308.

As illustrated in block 310 of FIG. 2, the system may provide a unified application for displaying a customer relationship to an appropriate representative. The unified application has specific regulations, restrictions, and prior customer correspondence associated therewith. An appropriate representative may be identified by the system based on which representative has experience with that particular customer, knowledge with a particular account in arrears, or general expertise regarding a field associated with the primary account for recovery. The system may identify and match the customer with the appropriate representative based on these factors.

Next, as illustrated in block 312 the system may allow the representative to initiate a communication with the customer. Allowing the representative to initiate a communication with a customer may be based on the determined regulations and restrictions. In some embodiments, the regulations and restrictions will not allow a representative to communicate with the customer. In some embodiments, the regulations and restrictions will warn against communicating with the customer. However, a representative may be able to override the warning. In some embodiments, the regulations and restrictions will allow a representative to communicate with the customer.

Finally, as illustrated in block 314, the system may track and store details regarding the customer communications. In this way, the system may track the disposition of the communication, such as determining if a communication was answered by the customer, a busy signal was received, or that the customer answered the communication. The system may identify the date, time, means of communication (such as specific telephone number, email address, or the like). Furthermore, the system may store any comments or notes made by the representative during the communications.

FIG. 3 provides a unified recovery system environment 200, in accordance with one embodiment of the present invention. As illustrated in FIG. 3, the unified recovery system 208 is operatively coupled, via a network 201 to the customer system 204, to the representative system 206, and to the financial institution network device (or system) 210. In this configuration, the unified recovery system 208 may send information to and receive information from the customer system 204, the representative system 206, and financial institution network device (or system) 210, to correlate all of the customer's relationships with an entity into one unified recovery system. FIG. 2 illustrates only one example of an embodiment of a unified recovery system environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the customer 202 is an individual who maintains products with the entity. These products may be one or more contracts, accounts, loans, transactions, agreements, or the like. As such, the customer 202 may have one or more products with payments in arrears. In some embodiments, the customer 202 may be a merchant or a person, employee, agent, independent contractor, and the like acting on behalf of the merchant that may have one or more products with payments in arrears with the entity.

As illustrated in FIG. 3, the unified recovery system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the representative system 206, the customer system 204, and the financial institution network device (or system) 210. As such, the communication device 246 generally comprises a modem, server, or other device for communicating with other devices on the network 201.

As further illustrated in FIG. 3, the unified recovery system 208 comprises computer-readable instructions 254 stored in the memory device 250, which in one embodiment includes the computer-readable instructions 254 of a data collection application 256. In some embodiments, the computer-readable instructions 254 include a communication application 257. In some embodiments, the computer-readable instructions 254 include a tracking application 258. In some embodiments, the memory device 250 includes data storage 252 for storing data related to unified recovery system including but not limited to data created and/or used by the data collection application 256, communication application 257, and/or tracking application 258.

In the embodiment illustrated in FIG. 3 and described throughout much of this specification, the data collection application 256 may be configured to collect and compile recovery programs utilized across the entity, customer relationship data across an entity, and to generate a centralized location for customer data.

In some embodiments, the data collection application 256 may collect and compile recovery products utilized across the entity into a single centralized unified recovery system 208. These may be collected from entity representative systems 206, the financial institution network device (or system) 210, and/or other systems. These recovery products may be internal or external dockets, ledgers, software, systems, or the like that are designed to initiate, monitor, and record any communication or payment associated with customer 202 product accounts in arrears.

In some embodiments, the data collection application 256 may collect and compile customer relationship data. In this way, the data collection application 256 may compile all information that an entity may have associated with a customer 202. Customer relationship data may include, but is not limited to addresses associated with a customer, customer contact information, customer affiliate information, customer products, customer products in arrears, or other information associated with the customer's one or more accounts, loans, products, purchases, agreements, or contracts that a customer may have with the entity. In some embodiments, the customer relationship associates primary, secondary, and relationship accounts and/or products with various customers to one customer. In this way, some accounts associated with a family member, friend, or that customer may all be associated with that customer. This way, the data collection application 256 compiles this data such that one individual customer may be contacted regarding one or more accounts/products in arrears. Customer affiliates may be one or more of co-signers, named on the account, family member, or the like associated with the account.

In other embodiments, the data collection application 256 may merge the recovery programs and the customer relationship data together into the unified recovery system 208. This data may be stored and grouped by the customer 202, customer identification number, account number, or telephone number. In this way, the system may generate a single centralized location for customer relationships for a representative to view and interact with. As such, any different recovery products and customer relationship data may be integrated into the one centralized unified recovery system.

In the embodiment illustrated in FIG. 3 the unified recovery system 208 further comprises a communication application 257. The communication application 257 allows for presentment of data to the representative, for rules determination and presentment, determines primary accounts for recovery, and for communication via a network 201 with the customer 202.

In some embodiments, the communication application 257 allows for presentment of data to the representative. This data may be customer 202 information, prior communications, communication dispositions, current accounts, accounts in arrears, primary accounts for recovery, and the like. In this way, the representative may have information associated with all customer relationships within the entity easily accessible for his/her communication with the customer 202.

In some embodiments, the communication application 257 allows for incorporation of a rules engine into the information provided to the representative. In some embodiments, the rules associated with the rules engine may be manually input by a representative. In some embodiments, the rules associated with the rules engine may be automatically input. In some embodiments, the rules may be based on entity requirements or preferences. In this way, the rules may be based on segments of the entity, such as lines of business, business units, or the like. In some embodiments, the rules may be based on customer preferences. In yet other embodiments, the rules may be based on legal requirements or restrictions. These rules may be communicated to the representative system 206 for the representative 205 from the communication application 257 via the network 201. In this way, the representative 205 may be aware of the rules for customer 202 communications.

Along with the rules, the communication application 257 may also determine a primary accounts for recovery associated with the customer 202, identify an appropriate representative 206, warn or prohibit communications to a customer 202, or require disposition input after a communication. Determining a primary account for recovery requires the communication application 257 to communicate with the financial institution network device (or system) 210 to select an account in arrears that is the primary account for the entity to focus recovery efforts. This may be determined by entity determined factors, such as interest rates, amounts due for recovery for one or more accounts in arrears, representative determined accounts, mortgage accounts, or the like. Selecting an appropriate representative may be achieved by the communication application 257 based on which representative has experience with that particular customer, knowledge with that particular primary account for recovery, or general expertise regarding a field associated with the primary account for recovery. The communication application 257 may communicate warning or prohibiting communications to a customer 202 via the network 201 to a representative system 206.

In some embodiments, the communication application 257 may allow for communications between a representative 205 of the entity and a customer 202 of the entity via the network 201. In preferred embodiments, the communication between the representative 205 and the customer 202 is typically done through telephone communications, such as telephone calls. Other representative 205 communication with the customer 202 may be via text messaging, email messaging, or other voice communications. In this way, the communication application 257 allows for the communication, limits the communication, and/or doesn't allow any communication based on the rules determined.

In the embodiment illustrated in FIG. 3 the unified recovery system 208 further comprises a tracking application 258. The tracking application 258 tracks the customer 202 communications. As such, dates, times, outcomes, responses, dispositions, or the like associated with each and every attempt to contact the customer 202 are tracked and recorded. In this way, the system may track whether a communication went through to the customer, whom the representative spoke to, the duration of the communication, time of communication, date of communication, or the like.

As illustrated in FIG. 3, a representative 205 may be an individual customer service representative for an entity. In some embodiments the representative 205 may be an individual employed by the entity. In some embodiments, the representative 205 may be an outside contractor for the entity. The representative 205 may have unique skills or experience with recovery payments in arrears for various products associated with products provided by the entity.

As illustrated in FIG. 3, the representative system 206 generally comprises a communication device 236, a processing device 238, and a memory device 240. The processing device 238 is operatively coupled to the communication device 236 and the memory device 240. In some embodiments, the processing device 238 may send or receive data from the customer system 204, financial institution network device (or system) 210, and/or the unified recovery system 208 via the communication device 236 over a network 201. As such, the communication device 236 generally comprises a modem, server, or other device for communicating with other devices on the network 201.

As further illustrated in FIG. 3, the representative system 206 comprises computer-readable instructions 242 stored in the memory device 240, which in one embodiment includes the computer-readable instructions 242 of a representative application 244.

In the embodiment illustrated in FIG. 3, the representative application 244 allows the representative system 206 to be linked to the unified recovery system 208 to communicate, via a network 201, the information related to the communications with a customer 202 related to products with payments in arrears. In some embodiments, the communication from the representative 205, such as communication inputted on the unified application by the representative 205, may be communicated to the unified recovery system 208 via the communication device 236. The representative application 244 may also allow the representative to receive data, such as the unified application including customer relationships, or the like, in order to communicate with the customer.

FIG. 3 also illustrates a customer system 204. The customer system 204 generally comprises systems with devices the same or similar to the devices described for the unified recovery system 208, and/or the representative system 206 (i.e., communication device, processing device, and memory device). Therefore, the customer system 204 may communicate with the unified recovery system 208, the representative system 206, and/or the financial institution network device (or system) 210 in the same or similar way as previously described with respect to each system. The customer system 204, in some embodiments, is comprised of systems and devices that allow the customer 202 to communicate with the representative 205 over a network 201. The customer system 204 may be, for example, a home phone, a desktop personal computer, a mobile system, such as a cellular phone, smart phone, personal data assistant (PDA), laptop, or the like. Although only a single customer system 204 is depicted in FIG. 3, the unified recovery system environment 200 may contain numerous customer systems 204.

The financial institution network device (or system) 210 is operatively coupled to the unified recovery system 208, the representative system 206, and/or the customer system 204 through the network 201. The financial institution network device (or system) 210 has systems with devices the same or similar to the devices described for the unified recovery system 208 and the representative system 206 (i.e., communication device, processing device, and memory device). Therefore, the financial institution network device (or system) 210 communicate with the unified recovery system 208, the representative system 206, and/or the customer system 204 in the same or similar way as previously described with respect to each system. The financial institution network device (or system) 210, in some embodiments, is comprised of systems and devices that allow the unified recovery system 208, the representative system 206, and the customer system 204 to access one or more accounts associated with the customer 202 of the financial institution.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 4 illustrates rules implementation for the unified recovery system 400, in accordance with one embodiment of the present invention. The rules for rule implementation 402 may be developed by different sources. As such, there may be rules that are system defined 404, customer defined 406, or legally defined 408.

System defined 404 rules for implementation include determining a primary account or product in arrears for recovery 410, identifying an appropriate representative 416, internal communication restrictions 418, and requiring the providing of disposition inputs 420. Each of these system defined 404 rules may be implemented by the entity, one or more lines of business of the entity, or the like. The system defined 404 rules may group the customer accounts with payments in arrears in segments, queues, campaigns, lists, or the like. In this way, the system defined rules 404 may group customer accounts with payments in arrears that are similar to each other, such that they may be grouped together and placed into a single representative's segment, queue, campaign, list, or the like.

Determining the primary account for recover requires the system to determine the priority of the products with payments in arrears that should be collected ahead of other products, such receiving payments on a home loan owned by the customer ahead of payments on a car loan and credit card also associated with customer. In this way, the system may determine which products in arrears require recovery first. This is referred to as the primary account for recovery. The primary account for recovery is the account or product that the entity has identified as having the highest priority for recovery of payments over the other accounts held by the customer. In specific embodiments, the primary account for recovery 410 is based on account level variables 412 and/or internal scoring metrics 414. The account level variables 412 include account information such as interest rate, amount in arrears, or the like. Internal scoring metrics 414 measure the various products provided by an entity to determine which are the most important to recover. These may include various types of loans, lines of credits, or the like. As such, the entity will internally determine the importance of recovering each of these products. As such, the system may identify the products with payments in arrears that is the product that all recovery efforts must be focused on initially, thus is the account or product identified to be recovered first, over all other accounts in arrears. This account is classified as the primary account in arrears for recovery 410.

In some embodiments, the system defined 404 rules include identifying an appropriate representative 416. Identifying an appropriate representative 416 based on rules requires determining which representative has experience with that particular customer, knowledge with that particular primary account for recovery, or general expertise regarding a field associated with the primary account for recovery.

In some embodiments, the system defined 404 rules include internal communication restrictions 418. These rules may place a restriction or warning on the attempted communication with a customer. The internal communication restrictions 418 may be provided by the system based on various factors associated with that customer or customer location. For example, the system may determine that there has been a natural disaster such as a hurricane, flood, tornado, earthquake or the like near the customer's location. As such, the system may restrict communications with that customer. Internal communication restrictions 418 may also be any other internally documented or noted reason for delaying or restricting the communications with a customer.

In some embodiments, the system defined 404 rules include rules requiring dispositions to be inputted 420. Dispositions may be narratives from the representative 422 or system 424 that detail the customer communications. Representative 422 disposition input may include information about the customer communication, such as if an agreement was reached on payment, updated information about the customer, or information about the discussion between the representative and the customer. System 424 disposition input may include system identified data regarding the customer communication. This may include the time of day for the communication, date of communication, whether the customer answered, whether a third party answered, whether the communication line was busy, whether there was no answer, or the like.

Customer defined 406 rules for implementation include which individual(s) to communicate with 426, an approved communication time 428, an approved means of communicating 430, a language of communication 432, or other 434. In some embodiments, the customer defined 406 rules include individuals to communicate with 426. In this way, a customer may identify a guarantor or individual within the household that may be responsible for the product in arrears. As such, the customer may note which individual to have communications with to discuss payments for the product in arrears.

In some embodiments, customer defined 406 rules include best communication times 428. In this way, the customer may state that the best time to reach or communicate with him/her is a specific time. For example, a customer may request the representative communication at 8:00 pm to discuss the product with payments in arrears. As such, the communication time customer defined 406 rule may be to communicate with the customer at the time the customer has specified.

In some embodiments, the customer defined 406 rules may include restrictions on the means of communication 430. The means of communication 430 may include telephone communications, other voice communications, email communication, text communications, or the like. The customer may recommend that he/she be communicated with strictly by one or more of the communication means. This request will be implemented as a rule for the representative to be made aware of prior to customer communications.

In some embodiments, the customer defined 406 rules may include a language of communication 432. In this way, various languages such as Spanish, French, German, or the like may be spoken with that particular customer. Finally, customer defined 406 rules may change based on the customer. As such, other rules may be added or removed based on customer preference. Thus, providing the customer with a more pleasant communication regarding products with payments in arrears.

Legally-defined 408 rules for implementation include rules based on any laws or regulations that are directed towards a representative communication with a customer regarding payments in arrears for products. These legally defined 408 regulations or restrictions may include laws or other regulations regarding the time zone 436 of the customer. The time zone 436 associated with the customer may be identified based on the area code of the customer's telephone number. In some embodiments, there may be more than one time zone associated with the customer. Each time zone 436 rule will be stored individually per telephone number or communications means. There may be legal restrictions associated with when a customer may be contacted based on the time of day because of a difference in time zones between the customer and the representative.

In some embodiments, the legally defined 408 rules may restrict the communication volume 438, otherwise referred to as communication velocity. The communication volume 438 may be the amount of times the representative may contact the customer within a predetermined time period, such as number of times in a day/week/month. Furthermore the communication volume 438 may include the duration of time that the representative may spend in communication with a customer within a predetermined time period, such a limited amount of time in a 24 hour period.

In some embodiments, the legally defined 408 rules may restrict the time 440 of day the customer may be contacted. For example, a customer may only be contacted between 9:00 am and 6:00 pm during the week and not at all during the weekend. As such, the time 440 restrictions will utilize the time zone of the area code and determine if it is acceptable to communicate with the customer at that time. The system may be configured to forbid calling the customer outside of the acceptable time period.

In some embodiments, the legally-defined 408 rules may include restrictions on the means of communication 442. The means of communication 442 may include telephone communications, other voice communications, email communication, text communications, or the like.

In some embodiments, the rules may, in some instances, be over rode by the representative. In this way, the representative may still contact the customer even if a rule restricting the communication may be in place. The representative may need to input a reason for overriding the rule. In some embodiments, the rule may be permanent or unchangeable, thus a representative may not ever be capable of override the rule. In this way, the system will not allow the representative to communicate with the customer at that time. In some embodiments, no rule may be placed on a customer communication. As such, the representative may contact the customer at any time.

FIG. 5 illustrates a process map for a representative use of the unified recovery system 500, in accordance with one embodiment of the present invention. As illustrated in decision block 502 the process 500 is initiated when a representative logs on to the system. If the representative does not log on to the system, the process 500 is terminated. If the representative successfully logs on to system. Next, the system provides the representative queue to the representative, as illustrated in block 504. The representative queue provides a list of one or more customer's that the representative may communicate with in a day. The queue may be tailored to the representative, such that the queue is unique based on the representative's experience or the like. The queue provided in block 504 is illustrated in further detail below in FIG. 6.

FIG. 6 provides an interface illustrating a representative queue 600, in accordance with one embodiment of the present invention. As illustrated in section 602 the customers within the representative's queue are listed. Specifically, the customer's name and status type associated with the product with payments in arrears. In this example, the customers are primary, secondary, and a guarantor of the products with payments in arrears. Next, as illustrated in section 604 the primary contact phone numbers and other contact information is displayed. As such, the customer in the customer section 602 may be different than the primary contact's information in section 604. Along with the primary contact's telephone number and contact information, the source of the product with payments in arrears is displayed as well as the account number associated therewith. As illustrated in block 606 customer circumstance, including rules or comments regarding prior communications may be displayed for quick reference prior to the representative selecting the customer and entering the interface associated with the customer unified application. The representative may add or subtract further comments in the customer circumstance section 606 by selecting the ok or cancel buttons 610. Finally, as illustrated in section 608, the relationship accounts are listed. The relationship accounts correspond to the customer's within that representative's queue. This section identifies whether the account associated with the customer is a primary account, the balance due, last payment, payment schedule, and other information about the customer. In some embodiments, the customer may not be the primary contact for the account, as such this section 608 may provide the relationship the customer is to the primary contact.

Referring back to FIG. 5, as illustrated in block 506 once the representative selects a customer to communicate with from the queue the representative is provided the unified application with the customer relationship and contact information associated therewith. In some embodiments, the unified application may be presented when a representative selects a customer to contact. In other embodiments, the unified application may be presented when the representative receives an incoming communication from the customer. In yet other embodiments, the system may trigger automatic presentment of the unified application to the representative at specified time intervals.

FIG. 7 illustrates an interface for the unified application with customer relationships 700, in accordance with one embodiment of the present invention. The unified application 700 presents the representative with all necessary customer relationship data, information about the products with accounts in arrears, and prior communication history in one application. The unified application 700 may display all of the customer relationships, programs, rules, and the like detailed above with respect to FIGS. 1-4. In this way, a representative may be able to provide the best possible customer service to a customer, even if this is the first time the representative has communicated with that particular customer.

As illustrated in section 702, the unified application 700 provides the representative with a general toolbar with various capabilities to search within a database, queue, or the like. The searches may be performed based on an account or product number, based on whether the unified application is open with another representative, by cross searching, or the like. As illustrated in section 704 a customer specific toolbar allows a representative to quickly determine the balance remaining on the product, the number of account cycles the product has already been through, and a status of the account. Also the representative may be provided an indication that the account is in arrears, if attempts to recover the account have been implemented, whether the account is a primary account, secondary account, or relationship account. A primary account is the account that is the account that recovery is the primary focus of first recovery. The secondary accounts are one or more accounts or products that the customer may have that also have payments in arrears, but is not the primary payment account for recovery. Relationship accounts are accounts where the customer is a guarantor or the like.

While the toolbars are provided to a representative to allow the representative to quickly discern information, more detail is provided about the customer relationship or account with payment in arrears in the subsequent sections. As illustrated in the customer information section 706A, the customer identification number, customer name, and customer address is presented to the representative. Furthermore, information, such as the last time an address was changed is also within the customer information section 706A. Below the customer information section 706A is the current payment detail section 712 where there is information presented about current payments, past payments, billing cycles, and when payments are due.

As illustrated in section 708, the system provides the representative with indicators, such as if the unified application is locked by another representative, or the like. In this example, the indicator 708 presented indicates to the representative that the alternative phone number should be used in this case. As such, the customer may have provided a customer defined rule to make all communications to an alternative telephone number. Other indicators may include blocks on accounts based on non-secured accounts, lead or primary accounts, and relationship accounts As illustrated in section 710 the communication means are presented. In this case the communication means are telephone numbers. This section allows a representative to select a telephone number to communicate with the representative. This section, along with section 708, is further detailed in FIG. 8.

Referring back to FIG. 7, the unified application 700 further provides the representative with details about amounts owed, both in total 714 and cash 716. At section 718, there are more specific details regarding the account or product with payments in arrears. As such, account details such as the open date, or the like may be presented to the representative. Furthermore, the last payment associated with that product or account may be posted in section 720. Comments from previous communications with the customer may be presented in section 722. Finally, the representative may also input actions in the action section 724. The action section 724 may also indicate other actions from other representatives associated with the customer or account. In this way, the representative will have an overview of prior comments 722 and actions 724 when a customer is speaking about prior interactions with other representatives, the representative will be knowledgeable about the communications.

Referring back to FIG. 5, once the system has provided the representative with the unified application, the representative may, in decision block 508 decide to initiate communication with the customer. If the representative does not decide to initiate communication, the process 500 is terminated. If the representative does decide to initiate communication, the communication may be initiated via the system or via an outside communication device (e.g., a desktop telephone, another computing device, or the like). Next, as illustrated in block 510, if the representative does initiate a communication in decision block 508, the system may determine if the representative is authorized to communicate with the customer 510. FIG. 8 illustrates the various indicators with respect to whether the representative may communicate with the customer at this time.

FIG. 8 illustrates an expanded view of the customer information section of the unified application 750, in accordance with one embodiment of the present invention. As described above with respect to FIG. 7, the customer information 706B provides the customer name, customer address, and in this embodiment, provides customer affiliates. Affiliates may be friends, relatives, guarantors, or the like. Furthermore, customer accounts in arrears 754 are illustrated. In this case there are three accounts in arrears listed in order of importance, from primary account down. Section 708 provides the indicators, indicating multiple accounts in arrears for this customer and that another representative has a lock on this customer unified application. In this way, a customer may have more than one account in arrears in which that customer is associated with or responsible for. A lock on the customer unified application may be because another representative is viewing the customer information, is in communication with the customer, or the like. As illustrated in section 710 the communication means for the customer are located. Here the customer has three different phone numbers that he/she may be reached. Furthermore, the communication means section 710 further comprises indicators 752 regarding the authorization of the representative to contact the customer using that contact means. These indicators 752 take into account all rules, regulations, or restrictions described above in FIG. 4. If the representative is completely restricted from contacting the customer an indicator will be provided and the representative will not be able to contact the customer. If there is a restriction but the representative may override the restriction, a warning indicator will be provided. If there are no restrictions on the communication a different indicator will be provided. For example, in the example illustrated in FIG. 8, two of the telephone numbers (Home and Business) both have a check mark indicator, indicating that the representative is free to communicate with the customer using either of the two telephone numbers. However, the other telephone number has a warning indicator, indicating that the representative may override the warning, but should have a reason to contact the customer using the other telephone number. There may be several reasons for a warning or no communications indication. If the telephone number that is selected has one of these warnings, the system will prompt the representative to a warning message, such as represented in FIGS. 10A-10B.

Referring back to FIG. 5, if the representative is not authorized to communicate with the customer in block 510 based on an indicator, the representative may decide to override the authorization if possible, as illustrated in decision block 514. If the indicator is not able to be overrode the process 500 sends the representative back to his/her queue, in block 504. FIGS. 10A and 10B illustrate a warning message presented to the representative 900, 1000, in accordance with one embodiment of the present invention. This warning message would be presented to the representative if he/she is attempting to communicate with a customer that the representative is not authorized to communicate with. The warnings provide a message to the representative regarding moving forward with the communication 902, 1002, as well as why there is a limitation on the communication with the customer. As illustrated in FIG. 10A the limitation in this case is that the telephone number is no longer valid, as illustrated in section 906. As such, the representative is not allowed to override the warning and is directed back to his/her queue. The warning also provided account information in section 908 as well as a box for the representative to input why he/she is overriding the warning in section 910. A typical override may be, for example, that the customer requested the representative call at that time/telephone number. A continuing calling customer button 912 may be highlighted if the representative is able to override the warning. If not, the representative must select the "do not call customer" button 914.

FIG. 10B provides an interface illustrating a warning message presented to the representative 1000, in accordance with one embodiment of the present invention. In this warning, the rule that is not satisfied is a legally defined rule associated with a time zone violation, as illustrated in section 1004. In section 1006 a description of the rule is presented to the representative. As illustrated in section 1008, the account information regarding the customer account associated with the customer that the representative is attempting to communicate is presented. Again, if allowed to override, the representative may input the reason for the override in section 1010. Finally, a "continuing calling customer" button 1012 may be highlighted if the representative is able to override the warning. If not, the representative must select the "do not call customer" button 1014.

Referring again back to FIG. 5, if the representative is authorized to communicate with the customer in block 510 or the representative overrode the warning not to communicate with the customer in decision block 514, the representative may be presented with a message to communicate to the customer, as illustrated in block 512. FIG. 9 provides an example interface illustrating a message sent prior to customer communications on the unified application 800, in accordance with one embodiment of the present invention. As illustrated in section 804, general information about the customer who is being contacted is presented. At section 802 the message is presented. This message is either to be read word-for-word to the customer or generally stated to the customer. The system then requires the representative to select that he/she read the message to the customer and select the "acknowledge" button prior to continuing with the conversation.

Referring again back to FIG. 5, once the representative has read the message presented to him/her to communicate to the customer, as illustrated in block 512, the system may allow the representative to communicate with the customer about his/her products with payments in arrears, as illustrated in block 516. Next, once the communication is complete, the system may require a disposition to be inputted, as illustrated in block 518. In some embodiments, the representative must input a disposition including comments regarding the customer communication, payment, payment schedules, or the like discussed during the communication. In some embodiments, the system may input disposition data including whether the customer answered the communication, whether there was a busy signal when the representative contacted the customer, the time of the contact, the duration of the communication, and/or the date of the communication. In some embodiments, the disposition may be a payment or payment schedule from the customer to satisfy the account in arrears. In this way, a payment may be documented for the account in arrears and as such the amount of recovery may be less and/or nothing after the disposition has been made.

In certain embodiment, during the process 500, especially after the representative communication with the customer in block 516 or during the input of a disposition in block 518, the system may send the representative an incoming communication from a customer, as illustrated in decision block 520. If there is an incoming communication from a customer queued for the representative, he/she will be presented with the unified application for the customer associated with the incoming communication, as illustrated in block 522. At that point the representative may then be allowed to communicate with the customer, as illustrated in block 516. Finally, if there is no incoming communications in decision block 520, the process reverts back to providing the representative with the representative's queue, as illustrated in block 504.

Referring now to FIGS. 11-13 and according to some embodiments of the invention, a user interface for presenting relevant questions to a representative during a representative-customer interaction is described. In some instances, the representative-customer interaction involves a discussion regarding payments in arrears associated with the customer. During such an interaction, the customer may present a request to the representative for handling of the payments in arrears or special treatment for payments in arrears associated with the customer. The representative then may use the interface of the present invention to present one or more questions to the customer in order to come to a conclusion regarding the customer's request for handling and/or special treatment. For example, the user or representative interface may determine one or more proposed questions for the representative to consider presenting to the customer in response to the customer's request for handling or special treatment. Such question(s) may include or be related to how the customer plans to satisfy the payment in arrears or other information relevant to the customer's request for handling or special treatment.

Referring now to FIG. 11, a flowchart illustrates a method 1100 for presenting relevant questions to a representative during a representative-customer interaction according to embodiments of the invention. The first step, represented by block 1102, is to receive a customer's request for handling or special treatment. This request for handling or special treatment may be received from an online form, from a mobile banking application, over the telephone during the interaction or during another interaction or otherwise. The request may include a request for a reduction of amount owed corresponding to one or more accounts or the overall customer relationship in some instances. In others, the request may include a request for a payment plan or extensions of time to make a payment or other timing requests.

The next step, represented by block 1104, is to determine at least one proposed question for presentation to the representative. The question or questions may be determined by a processing device based on various information. For example, information about the customer, the customer's payments in arrears, the customer's preferences, the customer's payment history, or other information may be used to determine one or more questions to ask the customer. For example, if the customer has a stellar payment history other than the current payment in arrears, this information may be used to formulate one or more proposed questions for the representative. For example, the information being used to determine the questions may be analyzed and determination(s) may be made such as the category or type of request or whether additional information is required of the customer to make a decision or in order to save additional information for future reference. Once this analysis occurs, the results may be compared to a predetermined datastore of proposed questions for presentation to the representative.

The next step, represented by block 1106, is, in response to receiving the request for handling or special treatment, present the at least one proposed question to the representative. This may be done audibly over the representative's headset or computer system speakers or may be communicated textually using the representative's computer interface running an application or a pop-up window.

Referring now to FIG. 12, a flowchart illustrates a method 1200 for presenting relevant questions to a representative during a representative-customer interaction according to other embodiments of the invention. One or more of the steps illustrated in FIG. 12 may be combined with one or more of the steps of FIG. 11 and/or one or more other steps. The first step of method 1200 is to retrieve customer preference data from at least one datastore, as represented by block 1202. As discussed above, a customer may have provided certain customer preference data, such as from what account they prefer payments to be debited, to what account they prefer payments to be credited, types of payments to debit or credit to certain accounts or otherwise. Such customer preference data may be retrieved from one or more datastores for use by the present invention.

The next step, represented by block 1204, is to present some or all the customer preference data to the representative for consideration during the representative-customer interaction. In some embodiments, the raw customer preference data or a representation of the same is presented directly to the representative for consideration during the interaction.

The next step, represented by block 1206, is to retrieve customer interaction data or customer payment in arrears data from at least one datastore. In various embodiments, another input to the system is customer interaction data. Customer interaction data refers to any data input to one or more datastores and related to an interaction between the representative's employer entity and the customer. For example, in various situations, the customer may have had multiple interactions with different representatives of the entity, and each representative may have entered data regarding the individual interactions into one or more system associated with the entity. In some situations, the information may be stored on disparate datastores. The present invention, in some embodiments, retrieves all relevant data from the disparate datastores to present the representative with a comprehensive and complete picture of the customer's accounts and any relevant payments in arrears, among other data.

In some embodiments, customer payment in arrears data is also retrieved from one more datastores. This data may include data related to one or more accounts to which the customer is linked either as owner, guarantor or otherwise. This data may indicate payment history for credit accounts, transaction history for any type of account or other information regarding payments in arrears associated with the customer.

The next step, represented by block 1208, is to determine the proposed question(s) based at least in part on the retrieved customer interaction data or customer payment in arrears data. The invention may determine one or more proposed questions based on the data that is retrieved. For example, if the data retrieved indicates that the customer has many accounts that are overdue, the proposed questions may be to confirm that the customer is aware of the various accounts that are overdue and the amounts that they are overdue. In some embodiments, the proposed questions may be related to consolidating multiple overdue accounts or some other solution and gauging the customer's reaction to the proposed solution.

The last step, represented by block 1210, is to determine the proposed question(s) based at least in part on the received request for handling or special treatment. In some embodiments, the customer has proposed a specific solution or request for special treatment/handling. In these situations, the proposed questions may be based on none, some or all the information discussed above and retrieved from one or more datastores in addition to the customer's specific request. For example, if the customer requests delay of due date for a payment in arrears, but the retrieved data indicates that the customer has already received multiple extensions on that specific payment in arrears, the proposed questions for the representative may relate to the previous extensions and why payment has not yet been made.

Referring now to FIG. 13, a flowchart illustrates a method 1300 for presenting relevant questions to a representative during a representative-customer interaction according to other embodiments of the invention. One or more of the steps illustrated in FIG. 13 may be combined with one or more of the steps of FIGS. 11 and/or 12 and/or one or more other steps. The first step of method 1300 is to analyze the received request for handling or special treatment, as represented by block 1302. The next step, which may be a substep of step 1302 and which is represented by block 1304, is to determine a request category or a request topic corresponding to the request. A request category may be a reduction in amount, an extension of time or otherwise. This may be determined by the system based on an analysis of a customer's input. For example, if a customer submits a textual request, perhaps prior to the interaction with the representative, the textual request can be searched for keywords. Found keywords are then associated with entries in a database of proposed questions in some embodiments. For example, if the keywords "reduce" and "amount" are located in a customer's request, then it may be determined, based on an entry in a prepopulated database of keyword combinations, request categories and proposed questions, that the category of request is a reduction in an amount of a payment in arrears. Such a request may be associated with several proposed questions in the database. In some cases, other information, such as the customer's preferences or the customer's payment history may also be correlated to the found keywords and/or the determined category in order to determine one or more appropriate or relevant questions for the representative to ask the customer during the interaction.

The next step, which may be a substep of step 1302 and which is represented by block 1306, is to determine the nature of the request. A nature of a request may be similar to a request category or topic as discussed above. Additionally, the nature of the request may also include determining the tone of the request based on additional keyword searching and correlation to one or more databases. For example, the request may have a positive or negative tone as determined by found keywords and their correlation to the database.

The next step, represented by block 1308, is to determine the proposed question(s) based at least in part on the nature of the request and/or the request category and/or the request topic.

Referring now to FIG. 14, an illustration of a screenshot 1400 of one embodiment of a representative's interface is shown. The representative's interface is for use with a system for determining an appropriate course of the representative working to recover payment in arrears. The system determines a guide for the representative to make the "right" choices during interactions with customers. The system also ensures the representative will keep a level of communication open with the customer if at all possible. Results of prior attempts to contact the customer are saved to tables to ensure compliance with rules is achieved, and data is updated based on a set of questions proposed to the representative for presentation to the customer. These questions confirm the customer's desires and ensure that a line of communication remains open.

Referring now to FIG. 15, a flowchart illustrates a method 1500 for determining an appropriate course of action for a representative working to recover payment in arrears. The first step, represented by block 1510 is to determine at least one customer preference regarding limitation of representative-customer interactions. The preference may be determined by retrieving the preference from a database of user/customer preferences in some embodiments. In other, the preference may be determined by retrieving information regarding one or more interactions between representatives and the customer. In a case where information regarding one or multiple interactions is retrieved, but where there is no information regarding an explicit customer preference (received directly from the customer or input by the representative), the information may be analyzed to determine the customer's preference. This may be determined by analyzing customer comments, customer actions, such as actions in an online banking environment, actions in an mobile application or other actions as well as actions or comments made or saved by the representative in relation to the customer-representative interaction(s). The analysis may be based on keywords found within any textual information linked or stored in association with the customer and/or the customer's account and/or interactions. The analysis may also be based on what fields or information is entered by the customer in the customer's online banking portal or application.

In some embodiments, the next step, represented by block 1520, is, based on the at least one customer preference, to present assistance information to the representative before or during the representative-customer interaction. As discussed in detail below, the assistance information may include one or more of a variety of types of information. For example, the assistance information may include one or more of information configured to inform the representative of the at least one customer preference, present the representative with at least one proposed question for presentation to the customer, and/or present the representative with at least one proposed method for representative-customer interaction.

The next step after determining the customer preference, in some embodiments, is, based on the at least one customer preference, to present the representative with at least one proposed question for presentation to the customer, as represented by block 1530. The proposed question may be determined by retrieving the proposed question from a database storing predetermined proposed questions. These predetermined, proposed questions may be predetermined to illicit a particular response or type of response from the customer. For example, if the customer's preference is determined to be that no calls are made to the customer and information is available to the system/representative that indicates that the customer indicated this preference when called on the customer's work telephone number, then a possible predetermined proposed question may be "do you mind if someone calls you on your home number rather than your work number?". Thus, the predetermined proposed question may be based on the recognition that the customer indicated a desire for no further contact in general, but that the customer made this indication while being called on a particular contact number. If the customer has other contact numbers, such as a home number, the customer may be more amenable to receiving a call at the other number. Accordingly, the predetermined proposed question may be crafted to determine whether the customer is truly opposed to all calls or whether the customer is actually just opposed to calls to the customer's work number. Another possible predetermined call given the example scenario is "You indicated you didn't want to receive any calls while we were speaking with you at work. If we ensure no calls will be made to your work number, would you be willing to take a call at home?".

The next step after determining the customer preference, in some embodiments, is, based on the at least one customer preference, to present the representative with at least one proposed method for representative-customer interaction, as represented by block 1540. The proposed method may include presenting one or more proposed questions to the representative as discussed above, and may or may not include additional information such as guidance for interacting with the customer. For example, the proposed method may suggest, based on the customer's type and longevity of relationship with the financial institution, that the customer be reminded of the benefits bestowed on the customer's various accounts over the last month or year. In other situations, the proposed method may recommend that the representative address some negative issue raised by the customer in a recent interaction with another representative. This information may be retrieved from the customer's account information stored in a customer database. In this regard, any outstanding issue important to the customer may be handled before bringing up any questions or discussion necessary to determine the customer's true preferences for limitations on customer-representative interaction.

Referring now to FIG. 16, flowchart illustrates a method 1600 for determining an appropriate course of action for a representative working to recover payment in arrears. The first step, represented by block 1530 and first presented in FIG. 15, is to present the representative with at least one proposed question for presentation to the customer based on the at least one customer preference. The next step, represented by block 1610, is to present the representative with a question based on the at least one customer preference regarding limitation of representative-customer interactions and intended to confirm a level of limitation of representative-customer interaction represented by the preference.

The next step, represented by block 1620, is to receive customer feedback in response to being presented a question based on the at least one proposed question. For example, if the customer's preference was indicated by the database to be receiving calls during the regular business day, the proposed question may be confirming that the customer's work number is appropriate for making those calls. However, the customer may respond that the customer actually wants the calls to be made during the business day to the customer's home and/or cell phone number so that a message can be left and the customer can call back when convenient. The representative may input this information into a data entry system so that the customer's preference may be captured, stored and retrieved for use during future customer-representative interactions.

The next step, represented by block 1630, is, in the event the level of limitation is not confirmed by the customer, to present the representative with at least one additional proposed question for presentation to the customer based on both the level of limitation and the customer's response. In this scenario, the question may present the customer with what is believed to be the customer's preference regarding limitations on customer-representative interactions, and the customer indicates that the presented preference is incorrect. In such a case, the representative may input that the presented preference is incorrect and the system may determine one or more follow up questions in response. For example, if the presented preference was that no calls were made after 9 PM on any night, and the customer indicates that is incorrect, the follow up question may be determined to be "would you prefer we call at a different time or a different number?". In some embodiments, the follow up may involve determining whether to inquire about other known numbers, other times of day, other days of the week, other numbers that are unknown, other contact methods such as email, text, standard mail or the like.

Referring now to FIG. 17, a flowchart illustrates a method 1700 for determining an appropriate course of action for a representative working to recover payment in arrears. The first step, represented by block 1540, which was first presented in FIG. 15, is to present the representative with at least one proposed method for representative-customer interaction based on the at least one customer preference. The next step, represented by block 1710, is to present the representative with information regarding one or more levels of limitation. The levels of limitation are related to the representative-customer interaction and the levels correspond with the customer's preference. The levels of limitation may be presented by the representative to the customer for approval or rejection. Examples of levels of limitation may be "no calls at night", "no calls on XYZ number", "no calls during business hours", "no calls during weekends", "no calls at all" and the like.

The next step, represented by block 1720, is to receive a response from the customer regarding approval of a level of limitation of representative-customer interaction. If the customer approves the level of limitation presented, then the system may present a follow up question in an attempt to gain additional access to the customer. For example, if the level of limitation is "no calls on XYZ" number and the customer approves, then the system may propose a question regarding other numbers to call or whether calling on XYZ number during different hours would be alright with the customer.

In some embodiments, the levels of limitation are organized into a hierarch of limitation, where "no contact at all" would be the most extreme limitation and "any contact at all" would be the least extreme limitation. The hierarchy may include various tiers that include different limitations on interaction that are grouped together as having similar levels of restriction. If it is confirmed that the customer has a particular level of restriction or his or her confirmed limitations fall within a particular level of limitation, then questions and/or methods for moving the customer into the next less extreme level of limitation may be determined and presented to the representative for presentation to the customer. For example, the questions may have little to do with the specific limitations the customer has placed on the customer's interaction, but rather, may be directed to opening another distinct channel of communication with the customer that would fall within a less extreme level of limitation.

The next step, represented by block 1730, is to receive information regarding any customer contact by the representative. In some embodiments, the representative during or after an interaction logs the interaction into the system for storing, in other embodiments, the system captures some or all the interaction (such as by audible recording and/or by real time analysis of the audio), and in some embodiments, some of the interaction is recorded by the representative and some is recorded by the system. In this way, future representative-customer interactions may be informed by the previous interactions.

Finally, the next step, represented by block 1740, is to store the information in any relevant system for subsequent retrieval by other representatives or to ensure compliance with customer contact rules. In some cases, the information is stored in tables that are otherwise maintained for compliance with customer contact rules. In some embodiments, some or all the information in the customer contact tables is made available to the representative during an interaction either explicitly or indirectly through the system's proposed questions and/or methods for interaction.

In various embodiments, the customer's preference is an indirect one. For example, the customer may submit a contact number during signing up for a promotion with the financial institution. In some situations, the customer's preference with be determined to be that the number may be used for contact; however, in some cases, the system may propose a question to confirm that the number input is a valid number for contacting the customer for interaction regarding payment in arrears.

In various embodiments, a rules engine provides logic to determine which from a database of questions are necessary to ask the customer. Each of the questions in the bank of questions has one or more response data fields. For example, a question may have four (4) possible answers and each of those answers from the customer could be entered by the representative conducting the interview. That answer would then provide an input for the rules engine such that the rules engine could determine the next one or more questions to be asked to the customer by the representative. Once the rules engine exhausted all the necessary questions based on the programmed logic, it would indicate to the representative that all necessary questions have been answered. As a specific example, there may be ten (10) questions that are asked to every customer at the beginning of a conference to provide context or direction for the conversation. The answers to these questions may be input into the system/rules engine by the representative, and the rules engine, based on pre-programmed logic, will determine which follow up questions are necessary. This process may be repeated until the rules engine's logic has determined that no further questions are necessary.

Embodiments of the invention may include determining a series of leading questions that are developed so as to be the least intrusive to future contact from representatives working to recover payment in arrears. In other words, the system may be configured such that, based on the customer preference regarding limitations, and in some cases also based on rules and/or laws regarding contacting customers, the system begins by presenting the least obstructive question(s) to the customer and, depending on the answers, moves to more obstructive question(s) and finally, if necessary, to the most obstructive question(s). Obstructive in this sense, refers to obstruction to future contact by representatives who are working to recover payment in arrears. For example, if a customer has registered no preference with the entity regarding limitations on contact and if the laws permit any contact, then the first question asked in this regard should not be limiting in any way, but perhaps may be confirmatory that the customer would allow any contact at any time, and if the customer answers responds that any contact at any time is not desired, then the follow up question may be more limiting as necessary, until the framework of the future contact restrictions are well defined and accepted by the customer without unnecessarily restricting the future contact.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for determining an appropriate course of action for a representative working to recover payment in arrears, the system comprising:
   a memory device with computer-readable program code stored thereon;
   a communication device;
   a processing device operatively coupled to the memory device and the communication device, wherein the processing device is configured to execute the computer-readable program code to:
      determine customer preferences of a customer regarding limitation of representative-customer interactions, comprising:
         retrieving at least one first customer preference of the customer from a database of customer preferences;
         retrieving information regarding one or more interactions between representatives and the customer;
         determine customer preferences from the retrieved information comprising:
            identifying, from the retrieved information, at least one second customer preference based on an explicit preference communicated by the customer; and
            analyzing the retrieved information based on keywords found within any textual information linked or stored in association with the customer, one or more of the customer's accounts, and one or more of the customer's interactions with representatives and which fields and what information is entered in the fields by the customer in customer's online banking portal or application, thereby resulting in at least one third customer preference; and
      based on the at least one first, second and third customer preferences, present assistance information to the representative before or during the representative-customer interaction, the assistance information configured to inform the representative of the at least one customer preference and present the representative with at least one proposed question for presentation to the customer, the comprising:
         determining that one of the second customer preferences is for no further contact in general during a first interaction;
         determining that the customer was communicating with the representative over a first channel of communication during the first interaction;

correlating the second customer preference for no further contact in general and the first channel of communication;

based on a predetermined set of rules, determining that the second customer preference for no further contact in general may be limited to the first channel of communication; and based on the predetermined set of rules, generating a proposed question for presentation to the customer, the proposed question configured to determine from the customer whether contact over channels of communication other than the first channel of communication are acceptable to the customer.

2. The system of claim 1, wherein:

the assistance information is configured to present the representative with at least one proposed question for presentation to the customer; and the at least one proposed question comprises a question based on the at least one customer preference regarding limitation of representative-customer interactions and intended to confirm a level of limitation of representative-customer interaction represented by the at least one customer preference.

3. The system of claim 2, wherein the processing device is further configured to execute the computer-readable program code to:

receive customer feedback in response to being presented a question based on the at least one proposed question; and in the event the level of limitation of representative-customer interaction represented by the at least one customer preference is not confirmed, present the representative with at least one additional proposed question for presentation to the customer based on both the level of limitation of representative-customer interaction and the customer's response to the question.

4. The system of claim 1, wherein:

the assistance information is configured to present the representative with at least one proposed method for representative-customer interaction; and the at least one method for representative-customer interaction comprises at least one proposed question based on the at least one customer preference regarding limitation of representative-customer interactions.

5. The system of claim 1, wherein:

the assistance information is configured to present the representative with at least one proposed method for representative-customer interaction; and the at least one method for representative-customer interaction comprises information regarding one or more levels of limitation of representative-customer interaction that correspond with the customer preference regarding limitation of representative-customer interactions for potential presentation of one or more of the one or more levels of limitation of representative-customer interaction for approval from the customer.

6. The system of claim 5, wherein the processing device is further configured to execute the computer-readable program code to:

receive a response from the customer regarding approval of a level of limitation of representative-customer interaction; and store the level of limitation of representative-customer interaction in any relevant system for subsequent retrieval by other representatives.

7. The system of claim 1, wherein the processing device is further configured to execute the computer-readable program code to:

receive information regarding any customer contact by the representative; and store the information in any relevant system for subsequent retrieval by other representatives or to ensure compliance with customer contact rules.

8. A computer program product for determining an appropriate course of action for a representative working to recover payment in arrears, the computer program product comprising at least one non-transitory computer-readable medium having computer-readable program code embodied therein, the computer-readable program code comprising:

code to determine customer preferences of a customer regarding limitation of representative-customer interactions, comprising:

retrieving at least one first customer preference of the customer from a database of customer preferences;

retrieving information regarding one or more interactions between representatives and the customer;

determine customer preferences from the retrieved information comprising:

identifying, from the retrieved information, at least one second customer preference based on an explicit preference communicated by the customer; and analyzing the retrieved information based on keywords found within any textual information linked or stored in association with the customer, one or more of the customer's accounts, and one or more of the customer's interactions with representatives and which fields and what information is entered in the fields by the customer in customer's online banking portal or application, thereby resulting in at least one third customer preference; and code to, based on the at least one first, second and third customer preferences, present assistance information to the representative before or during the representative-customer interaction, the assistance information configured to inform the representative of the at least one customer preference and present the representative with at least one proposed question for presentation to the customer, the presenting comprising:

determining that one of the second customer preferences is for no further contact in general during a first interaction;

determining that the customer was communicating with the representative over a first channel of communication during the first interaction;

correlating the second customer preference for no further contact in general and the first channel of communication;

based on a predetermined set of rules, determining that the second customer preference for no further contact in general may be limited to the first channel of communication; and based on the predetermined set of rules, generating a proposed question for presentation to the customer, the proposed question configured to determine from the customer whether contact over channels of communication other than the first channel of communication are acceptable to the customer.

9. The computer program product of claim 8, wherein:

the assistance information is configured to present the representative with at least one proposed question for presentation to the customer; and the at least one proposed question comprises a question based on the at least one customer preference regarding limitation of representative-customer interactions and intended to confirm a level of limitation of representative-customer interaction represented by the at least one customer preference.

10. The computer program product of claim 9, wherein the computer program code further comprises:
code to receive customer feedback in response to being presented a question based on the at least one proposed question; and
code to, in the event the level of limitation of representative-customer interaction represented by the at least one customer preference is not confirmed, present the representative with at least one additional proposed question for presentation to the customer based on both the level of limitation of representative-customer interaction and the customer's response to the question.

11. The computer program product of claim 8, wherein:
the assistance information is configured to present the representative with at least one proposed method for representative-customer interaction; and
the at least one method for representative-customer interaction comprises at least one proposed question based on the at least one customer preference regarding limitation of representative-customer interactions.

12. The computer program product of claim 8, wherein:
the assistance information is configured to present the representative with at least one proposed method for representative-customer interaction; and
the at least one method for representative-customer interaction comprises information regarding one or more levels of limitation of representative-customer interaction that correspond with the customer preference regarding limitation of representative-customer interactions for potential presentation of one or more of the one or more levels of limitation of representative-customer interaction for approval from the customer.

13. The computer program product of claim 12, wherein the computer program code further comprises:
code to receive a response from the customer regarding approval of a level of limitation of representative-customer interaction; and
code to store the level of limitation of representative-customer interaction in any relevant system for subsequent retrieval by other representatives.

14. The computer program product of claim 8, wherein the computer program code further comprises:
code to receive information regarding any customer contact by the representative; and
code to store the information in any relevant system for subsequent retrieval by other representatives or to ensure compliance with customer contact rules.

15. A computer-implemented method for presenting relevant questions to a representative during a representative-customer interaction, the method comprising:
determining, customer preferences of a customer regarding limitation of representative-customer interactions, comprising:
retrieving at least one first customer preference of the customer from a database of customer preferences;
retrieving information regarding one or more interactions between representatives and the customer;
determine customer preferences from the retrieved information comprising:
identifying, from the retrieved information, at least one second customer preference based on an explicit preference communicated by the customer; and
analyzing the retrieved information based on keywords found within any textual information linked or stored in association with the customer, one or more of the customer's accounts, and one or more of the customer's interactions with representatives and which fields and what information is entered in the fields by the customer in customer's online banking portal or application, thereby resulting in at least one third customer preference; and
based on the at least one first, second and third customer preferences, present assistance information to the representative before or during the representative-customer interaction, the assistance information configured to inform the representative of the at least one customer preference and present the representative with at least one proposed question for presentation to the customer, the presenting comprising:
determining that one of the second customer preferences is for no further contact in general during a first interaction;
determining that the customer was communicating with the representative over a first channel of communication during the first interaction;
correlating the second customer preference for no further contact in general and the first channel of communication;
based on a predetermined set of rules, determining that the second customer preference for no further contact in general may be limited to the first channel of communication; and
based on the predetermined set of rules, generating a proposed question for presentation to the customer, the proposed question configured to determine from the customer whether contact over channels of communication other than the first channel of communication are acceptable to the customer.

16. The method of claim 15, wherein:
the assistance information is configured to present the representative with at least one proposed question for presentation to the customer; and
the at least one proposed question comprises a question based on the at least one customer preference regarding limitation of representative-customer interactions and intended to confirm a level of limitation of representative-customer interaction represented by the at least one customer preference.

17. The method of claim 16, further comprising:
receiving customer feedback in response to being presented a question based on the at least one proposed question; and
in the event the level of limitation of representative-customer interaction represented by the at least one customer preference is not confirmed, presenting the representative with at least one additional proposed question for presentation to the customer based on both the level of limitation of representative-customer interaction and the customer's response to the question.

18. The method of claim 15, wherein:
the assistance information is configured to present the representative with at least one proposed method for representative-customer interaction; and
the at least one method for representative-customer interaction comprises at least one proposed question based on the at least one customer preference regarding limitation of representative-customer interactions.

19. The method of claim 15, wherein:

the assistance information is configured to present the representative with at least one proposed method for representative-customer interaction; and the at least one method for representative-customer interaction comprises information regarding one or more levels of limitation of representative-customer interaction that correspond with the customer preference regarding limitation of representative-customer interactions for potential presentation of one or more of the one or more levels of limitation of representative-customer interaction for approval from the customer.

20. The method of claim 19, further comprising:

receiving a response from the customer regarding approval of a level of limitation of representative-customer interaction; and storing the level of limitation of representative-customer interaction in any relevant system for subsequent retrieval by other representatives.

21. The method of claim 15, further comprising:

receiving information regarding any customer contact by the representative; and storing the information in any relevant system for subsequent retrieval by other representatives or to ensure compliance with customer contact rules.

\* \* \* \* \*